United States Patent
Fu et al.

(10) Patent No.: US 9,967,318 B2
(45) Date of Patent: May 8, 2018

(54) APPARATUS, SYSTEMS, AND METHODS FOR CLOUD AGNOSTIC MULTI-TIER APPLICATION MODELING AND DEPLOYMENT

(71) Applicant: Cliqr Technologies, Inc., Santa Clara, CA (US)

(72) Inventors: Tianying Fu, San Jose, CA (US); Gautam Joshi, San Jose, CA (US); Saad Ali Malik, Milpitas, CA (US); Abhinav Nagaraj, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 170 days.

(21) Appl. No.: 14/474,943

(22) Filed: Sep. 2, 2014

(65) Prior Publication Data
US 2014/0372533 A1    Dec. 18, 2014

Related U.S. Application Data

(63) Continuation-in-part of application No. 13/024,302, filed on Feb. 9, 2011, now Pat. No. 8,862,933.

(51) Int. Cl.
*H04L 29/08* (2006.01)
*G06F 9/50* (2006.01)

(52) U.S. Cl.
CPC .......... *H04L 67/10* (2013.01); *G06F 9/5072* (2013.01)

(58) Field of Classification Search
CPC ........................................ H04L 67/10
See application file for complete search history.

(56) References Cited

U.S. PATENT DOCUMENTS

| | | |
|---|---|---|
| 6,718,535 B1 | 4/2004 | Underwood |
| 7,523,190 B1 | 4/2009 | Bickerstaff et al. |
| 8,904,005 B2 | 12/2014 | Ferris et al. |
| 2002/0013895 A1 | 1/2002 | Kelley et al. |
| 2012/0239739 A1 | 4/2004 | Manglik et al. |
| 2007/0083650 A1 | 4/2007 | Collomb et al. |
| 2007/0260702 A1 | 11/2007 | Richardson et al. |
| 2009/0216975 A1 | 8/2009 | Halperin et al. |
| 2009/0300151 A1 | 12/2009 | Friedman et al. |

(Continued)

OTHER PUBLICATIONS

"Third-Party Submission under 37 CFR 1.290 Concise Description of Relevance," filed in U.S. Appl. No. 14/497,196, filed Feb. 18, 2015.

*Primary Examiner* — Sulaiman Nooristany
(74) *Attorney, Agent, or Firm* — Ronald Fernando

(57) ABSTRACT

Embodiments disclosed facilitate obtaining a cloud agnostic representation of a multi-tier application. Cloud specific implementations of the cloud agnostic representation may be deployed on a plurality of clouds. In some embodiments, dependency information for each component service in a multi-tier application is obtained, wherein the dependency information for a component service indicates prerequisites for starting the component service; and a cloud agnostic representation of the multi-tier application is derived, wherein the cloud agnostic representation of the multi-tier application comprises metadata for obtaining each of the component services for a plurality of clouds, and a sequence for starting each of the component services, the sequence based, in part, on the dependency information.

21 Claims, 13 Drawing Sheets

(56) References Cited

U.S. PATENT DOCUMENTS

| | | |
|---|---|---|
| 2010/0042720 A1 | 2/2010 | Stienhans et al. |
| 2010/0061250 A1* | 3/2010 | Nugent .................. H04L 67/10 |
| | | 370/242 |
| 2010/0070319 A1 | 3/2010 | Prafullchandra et al. |
| 2010/0088150 A1 | 4/2010 | Mazhar et al. |
| 2010/0125476 A1 | 5/2010 | Yeom et al. |
| 2010/0125844 A1 | 5/2010 | Mousseau et al. |
| 2010/0191796 A1 | 7/2010 | Almeida et al. |
| 2010/0228819 A1 | 9/2010 | Wei |
| 2010/0235830 A1 | 9/2010 | Shukla et al. |
| 2011/0041066 A1* | 2/2011 | Kimmet .................... G06F 8/61 |
| | | 715/736 |
| 2011/0185292 A1 | 7/2011 | Chawla et al. |
| 2012/0131591 A1 | 5/2012 | Moorthi et al. |
| 2012/0158803 A1 | 6/2012 | Kandasamy et al. |
| 2012/0179820 A1 | 7/2012 | Ringdahl et al. |
| 2015/0039770 A1 | 9/2012 | Manglik et al. |
| 2012/0254966 A1 | 10/2012 | Parker |
| 2013/0151598 A1 | 6/2013 | Fu et al. |
| 2014/0033315 A1* | 1/2014 | Biswas ................. G06F 21/105 |
| | | 726/26 |
| 2014/0040656 A1 | 2/2014 | Ho et al. |

* cited by examiner

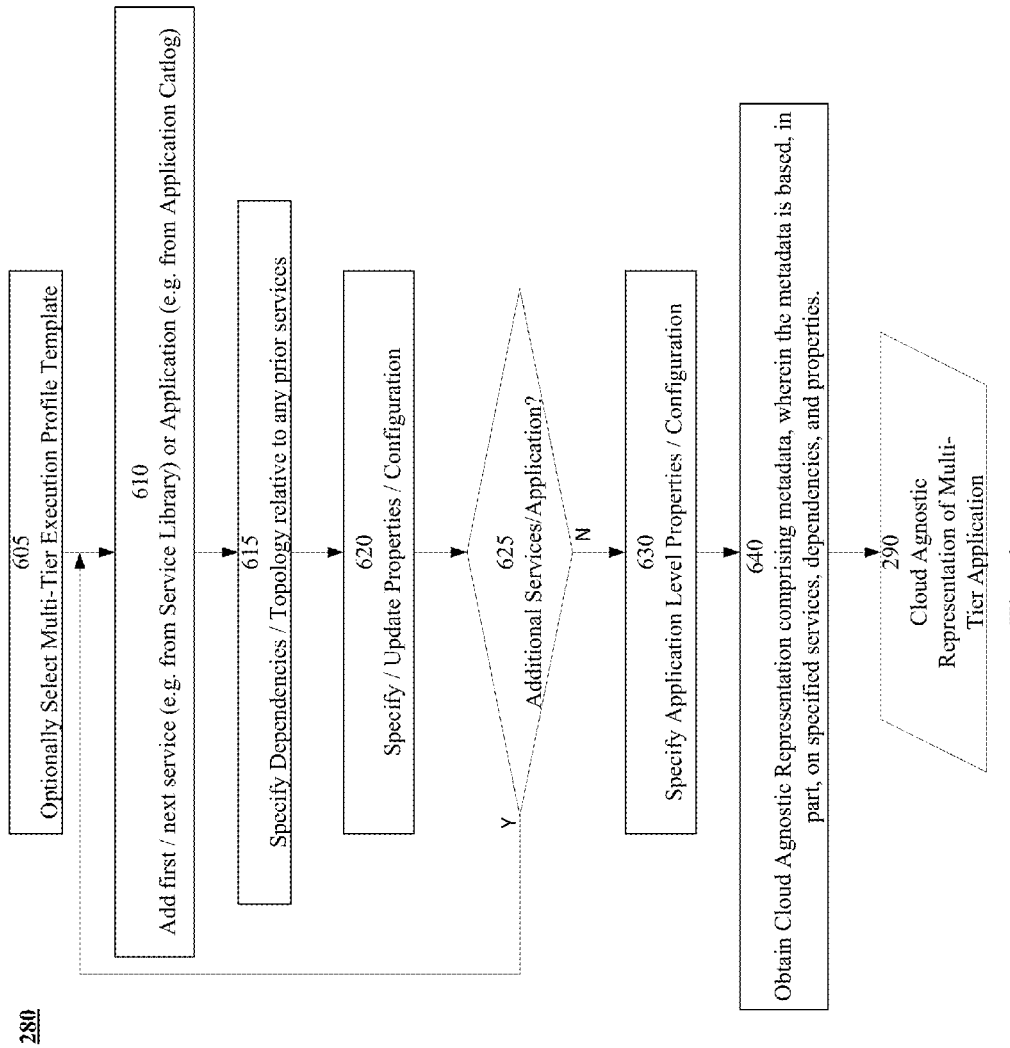

APPARATUS, SYSTEMS, AND METHODS FOR CLOUD AGNOSTIC MULTI-TIER APPLICATION MODELING AND DEPLOYMENT

CROSS-REFERENCE TO RELATED APPLICATION(S)

This application is a continuation-in-part of U.S. patent application Ser. No. 13/024,302 filed Feb. 9, 2011, entitled "Apparatus, Systems and Methods for Deployment and Management of Distributed Computing Systems and Applications," which is assigned to the assignee hereof, and which is incorporated by reference herein in its entirety for all purposes.

BACKGROUND

Field of the Invention

The present invention relates to the field of distributed computing and in particular, to apparatus, systems, and methods to facilitate cloud agnostic modeling and deployment of cloud-based applications including multi-tier applications.

Description of Related Art

The performance of computing applications may often be increased by distributing the computational workload across a networked cluster of computers. A physical networked cluster of computers with attendant software facilitating virtualization is often referred to as a "cloud" or "cloud infrastructure" or simply an infrastructure.

Clouds may be public and/or private. For example, in publicly available clouds or "public clouds", these resources can be accessed programmatically (e.g. using Application Programming Interfaces (APIs)) over the Internet and may be made available as virtual machines (VMs) on a pay-per-use basis to customers. On the other hand, organizations may have private clouds for use by employees or customers within an enterprise's data center and/or may use a hybrid cloud, which may be a combination of public-private clouds to deploy and run applications.

However, in a multi-cloud, and/or hybrid cloud environment, each cloud may have and/or use proprietary APIs. For example, clouds may use proprietary APIs for specification and/or configuration of VMs, storage, network security, etc.

Conventionally, developing even simple cloud applications based on off-the-shelf services may require extensive cloud-integration prior to cloud deployment. As an example, the cloud-integration tasks for services on a cloud may include: downloading service binary packages, extracting and installing configuration scripts such as initialization, start and stop scripts, etc. for the service. Moreover, in addition to the tasks associated with the installation and configuration of services, end users typically expend additional time and effort for the installation of application data and binaries.

The resource-intensive process for migrating applications between clouds limits user-flexibility and creates de facto "cloud lock-in". As a consequence of cloud lock-in users cannot easily deploy applications across clouds. For example, in conventional systems, in addition to the effort and resources invested in developing applications for one cloud, significant effort may be needed to move those applications from one cloud to another. The overhead and resource commitments to develop, deploy and/or migrate cloud-based applications may discourage users from availing of new capabilities, features, lower rates, better performance, etc. that may be available at a given time. In addition, the availability of user applications may be severely compromised or constrained if the cloud provider that the user is locked-in to encounters technical problems or goes out of business.

Therefore, there is a need for systems, methods and apparatus to facilitate the migration and deployment of distributed applications including cloud-based applications across clouds.

SUMMARY

Consistent with embodiments disclosed herein, various exemplary apparatus, systems and methods for facilitating the deployment and migration of application between clouds are described.

In some embodiments, a processor-implemented method may comprise: obtaining, for a multi-tier application comprising a plurality of components, dependency information for each component in the plurality, wherein the dependency information for a component comprises information indicating prerequisites for starting the component. The method may further comprise: deriving a cloud agnostic representation of the multi-tier application, wherein the cloud agnostic representation of the multi-tier application may comprise metadata for: obtaining each of the plurality of components for a plurality of clouds, and starting each of the components, wherein each component in the plurality of components is started based on a starting sequence derived, in part, from the dependency information.

In another embodiment, an apparatus may comprise: a memory comprising dependency information for each component in a plurality of components of a multi-tier application, wherein the dependency information for a component comprises information indicating prerequisites for starting the component; and a processor coupled to the memory. The processor may be configured to: obtain the dependency information for each component in the plurality; and derive a cloud agnostic representation of the multi-tier application, wherein the cloud agnostic representation of the multi-tier application comprises metadata for: obtaining each of the plurality of components for a plurality of clouds, and starting each of the components, wherein each component in the plurality of components is started based on a starting sequence derived, in part, from the dependency information.

In a further embodiment, a non-transitory computer-readable medium may comprise instructions, which, when executed by a processor, perform steps in a method, where the steps may comprise: obtaining, for a multi-tier application comprising a plurality of components, dependency information for each component in the plurality, wherein the dependency information for a component comprises information indicating prerequisites for starting the component; and deriving a cloud agnostic representation of the multi-tier application, wherein the cloud agnostic representation of the multi-tier application comprises metadata for: obtaining each of the plurality of components for a plurality of clouds, and starting each of the components, wherein each component in the plurality of components is started based on a starting sequence derived, in part, from the dependency information.

Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

BRIEF DESCRIPTION OF THE DRAWINGS

FIG. 6 shows a flowchart for an exemplary method for obtaining cloud agnostic representations of a multi-tier application.

DETAILED DESCRIPTION

Figure 1:
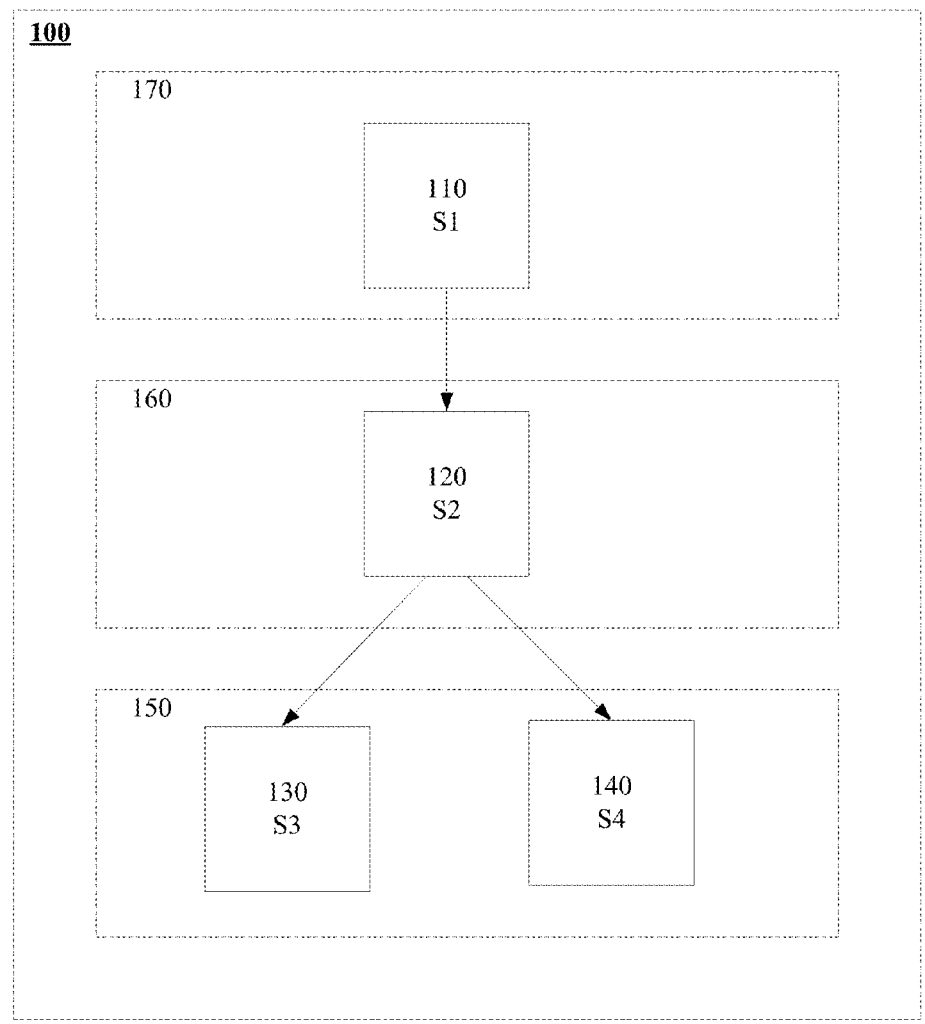
FIG. 1 illustrates an exemplary multi-tier cloud application illustrating an initialization sequence based on service dependencies.

In accordance with embodiments disclosed herein, apparatus, systems and methods to facilitate secure communications for cloud-based applications are presented.

A physical networked cluster of computers with attendant software facilitating virtualization is often referred to as a "cloud" or "cloud infrastructure" or simply an infrastructure. The software layer permits the underlying physical hardware associated with clouds, which can include servers, memory, storage, and network resources, to be viewed as virtualized units. These virtualized units represent some fraction of the underlying computing hardware or resources supported by the cloud infrastructure. Therefore, from a logical perspective, clouds may be viewed as a collection of VMs. Typically, a cloud may provide a variety of VM types with different computing (CPU), memory, storage, networking, and Operating System (OS) options. A "cloud node" or "node" may be responsible for the control and operation of one or more VMs, and there may be several nodes per cloud.

Clouds, thus, provide access to computing infrastructure remotely, including compute, storage and network resources, so that the resources can be reserved, provisioned, accessed and released programmatically. For example, programmatic interfaces such as Application Programming Interfaces (APIs), System Development Kits (SDKs), Web Services, etc. may be used to access resources made available by clouds remotely over a wide-area network (WAN).

VMs are typically software implementations of a computer. VMs often provide a complete system platform, which may also support the execution of a complete operating system by the VM in addition to one or more applications. One method of deploying VMs on clouds may use images termed Virtual Machine Images (VMIs), which are typically filesystem images including an operating system, application servers and/or application(s) to be executed by the VM, data, and a cloud specific portion.

For users who deploy or desire to deploy one or more applications on multiple clouds, the process of migrating applications from one cloud to another can be challenging. Conventionally, even simple cloud applications based on off-the-shelf services may require extensive cloud-integration prior to cloud deployment. Cloud-integration tasks for services on a cloud may include, for example, downloading service binary packages, extracting and installing configuration scripts such as initialization, start and stop scripts, etc. for the service. Moreover, in addition to the tasks associated with the installation and configuration of services, end users typically expend additional time and effort for the installation of application data and binaries. Migrating cloud based applications between clouds, or maintaining different versions of the same application to run on multiple clouds can be a time consuming, resource intensive and expensive proposition. Thus, disclosed embodiments facilitate the deployment and migration of distributed applications, including multi-tier applications, between clouds.

The terms "cloud independent representation" and "cloud agnostic representation" are used synonymously and refer to a representation of a distributed computing application that may be deployed on a plurality of clouds. The "cloud independent representation" or "cloud agnostic representation" may include a representation of an underlying pattern of execution and/or resource utilization of the distributed computing application. In some embodiments, the "cloud independent representation" or "cloud agnostic representation" may take the form of application descriptors and/or metadata that are not specific to any particular cloud. The "cloud agnostic representation" or "cloud independent representation" may be used to obtain cloud specific commands and/or parameters at the time of deployment of the distributed computing application in a manner consistent with embodiments disclosed herein.

FIG. 1 illustrates an exemplary multi-tier cloud application illustrating an initialization sequence based on service dependencies. The term multi-tier application refers to applications that exhibit and/or are structured in tiers or layers, where each tier or layer may provide one or more services. Except where otherwise specified, the term "service" as used herein refers broadly to software that facilitates delivery of functionality, content etc, over a network (including, for example, web server services, database services, load balancing services, caching services etc) and/or applications which may include standalone program code and/or program code that functions in combination with one or more of the above "services".

The term "services" is also used to refer to Virtual Machine Images (VMIs) or Infrastructure as a Service (IaaS). In some embodiments, VMIs may include service binaries and descriptors describing service phases and commands to be executed at various phases (e.g. before or after installation, startup, migration, shutdown, etc). In addition, "services" may also include "end-point based services," which may be Platform as a Service (PaaS). The term "end point based service" or PaaS is used to refer to categories of services where the service provider makes available both a computing platform and a solution stack associated with the platform as a service to users. End-point based services (may be available, for example, from one or more vendors. External endpoint based services or external endpoints refer to services that are external to a multi-tier cloud based application, where the services are accessible from within the multi-tier cloud-based application. For example, Amazon Relational Database Service (RDS) provided by Amazon may be used to set up a cloud-based relational database that is accessible by a deployed cloud based multi-tier application generated from cloud agnostic representation of multi-tier application 290.

For example, a multi-tier application may include three tiers, which may take the form of a web tier, application tier, and a database tier. Each tier may comprise one or more services. The web tier may provide services to manage incoming hypertext transfer protocol ("http") requests. The web-tier may serve the static content and make REpresentational State Transfer calls or RESTful calls to the application layer. REST is a stateless client-server, cacheable communications protocol, which may use the HTTP protocol to effect the creation, updating, reading, and/or deletion of data. The application tier may provide application specific services such as business logic based on input received from the web tier and services to generate queries to and/or process response received from the database tier. Services in the database tier may process queries received from the application tier, retrieve data from a database, and send query responses to the application tier, which, in turn, may process the received responses and provide the processed data to the web tier.

FIG. 1 shows an exemplary multi-tier application 100 with four services illustrating an initialization sequence based on dependencies among the services.

In general, as shown in FIG. 1, there are dependencies between services in different application tiers in a multi-tier application. The topology of a multi-tier application may include a representation of the tiers, the services in each tier and the dependencies between services in the multi-tier application. The dependencies in a multi-tier application may be used to determine an order or sequence for starting services in the multi-tier application. In general, dependency information may include information about pre-requisites for starting, deploying and/or running a service. Dependency information may include information about service dependencies, residence dependencies, runtime dependencies, resource dependencies etc.

For example, service dependency information may be used to specify that a first service is dependent on one or more other services. In some instances, service dependency information for a first service may also specify that the first service cannot depend on one or more other services.

As another example, residence dependency information may include VM co-residency information and/or VM placement information. VM co-residency information for a first component (e.g. a service or a nested application that is part of a multi-tier application) may specify information about other components that may be co-resident with the first component on a given VM when deployed. In some instances, VM co-residency information for a first service may specify that the first service cannot be co-resident with one or more other specified services running on the same VM. In some embodiments, the VM placement information may specify a mapping of components to VMs. For example, VM placement information may determine how application components are distributed among available VMs.

As a further example, based on the service dependency information, some services may be started concurrently during deployment, whereas the start up of other services that depend on one or more prerequisite services may be held back until the respective prerequisite services are running or have been started.

Further, resource dependency information for a service may specify resources hardware and software that the service is dependent upon. These may include, for example, security compliance parameters, (e.g. firewalling capability, identity and access management, data protection, etc.), disk input-output operations per second (IOPS), etc.

As shown in FIG. 1, exemplary multi-tier application 100 includes three-tiers 150, 160 and 170. Services S3 130 and S4 140 are in a first tier 150, while services S2 120 and S1 110 are in tiers 160 and 170, respectively. Typically, for a multi-tier application if services with no dependencies are considered as being in Tier 1, then services in Tier i for i>1 depend on services in Tier (i−1). A tier i may include one or more services. Tiers may be scalabale. Scalability refers to the property by which a tier i (which may be viewed as a service cluster) can be instantiated and run concurrently in multiple VMs.

Further, as shown in FIG. 1, service S2 120 depends on services S3 130 and S4 140, while service S1 110 depends on service S2 120. Therefore, based on the dependency information, an initialization sequence for services S1-S4 may be determined. Accordingly, initialization of S2 120 may start after S3 130 and S4 140 have been initialized, and initialization of S1 may commence after S2 has initialized.

Multi-tier cloud based applications are used widely in a variety of areas including e-Commerce, Business-to-Business, Banking and Financial, Retail and Social Networking etc. Each application/class of applications may have different deployment configurations with web servers, application servers and database servers.

Typically, most enterprise multi-tier applications are composed or built from a set of common underlying services. For example, a typical multi-tier web application may include one or more of: front-end cache or web accelerator services (e.g. Varnish etc.) to speed up access to web content; load balancing services (e.g. Nginx ("engine-X"), HAProxy etc.), which may distribute workloads between VMs used by the multi-tier application; application server services (e.g. Tomcat, Jetty, Jboss, Weblogic, Websphere etc), which may serve web pages to end users including web pages that include Java-based web content such as servlets; relational database services (e.g. MySQL, MS SQL Server, Oracle, DB2 etc.), which use Structured Query Language (SQL) to access and manage relational database content; non-relational (or so-called "NoSQL") database services (e.g. Cassandra, Mongo D B etc.), which provide access to variety of non-relational distributed databases, which may include document databases, key-value stores, graph stores such as information about interrelationships between entities, etc.; distributed file systems (e.g. GlusterFS, FhGFS, Lustre etc), which may provide scalable network attached storage (NAS) and/or distribute/aggregate data to/from a plurality of storage servers into a parallel network file system; etc.

Some disclosed embodiments facilitate configuration of multi-tier applications seamlessly for deployment across a plurality clouds, in part, by providing a cloud agnostic representation of the multi-tier application, wherein the cloud agnostic representation of the multi-tier application may include cloud agnostic information relating to a plurality of services and further include dependencies between the plurality of services, and configuration information for the services. In some embodiments, in part, because of the absence of cloud specific information in the cloud agnostic representation of the multi-tier application, the multi-tier application may be deployed seamlessly on a plurality of clouds. Thus, the need for expensive resource intensive cloud application migration is obviated.

The term "cloud agnostic representation" is used to refer to a representation of an application that does not include parameters, instructions or other information that is specific to a cloud. Because cloud agnostic representations do not include information that is cloud-dependent, the cloud agnostic representation may be deployed to a plurality of clouds in a manner consistent with embodiments disclosed herein. For example, in contrast to conventional applications, which are designed to run on a specific cloud and require labor intensive and expensive modifications to the program code prior to deployment on another cloud, the cloud agnostic representation may be seamlessly deployed to a plurality of clouds.

Figure 2:
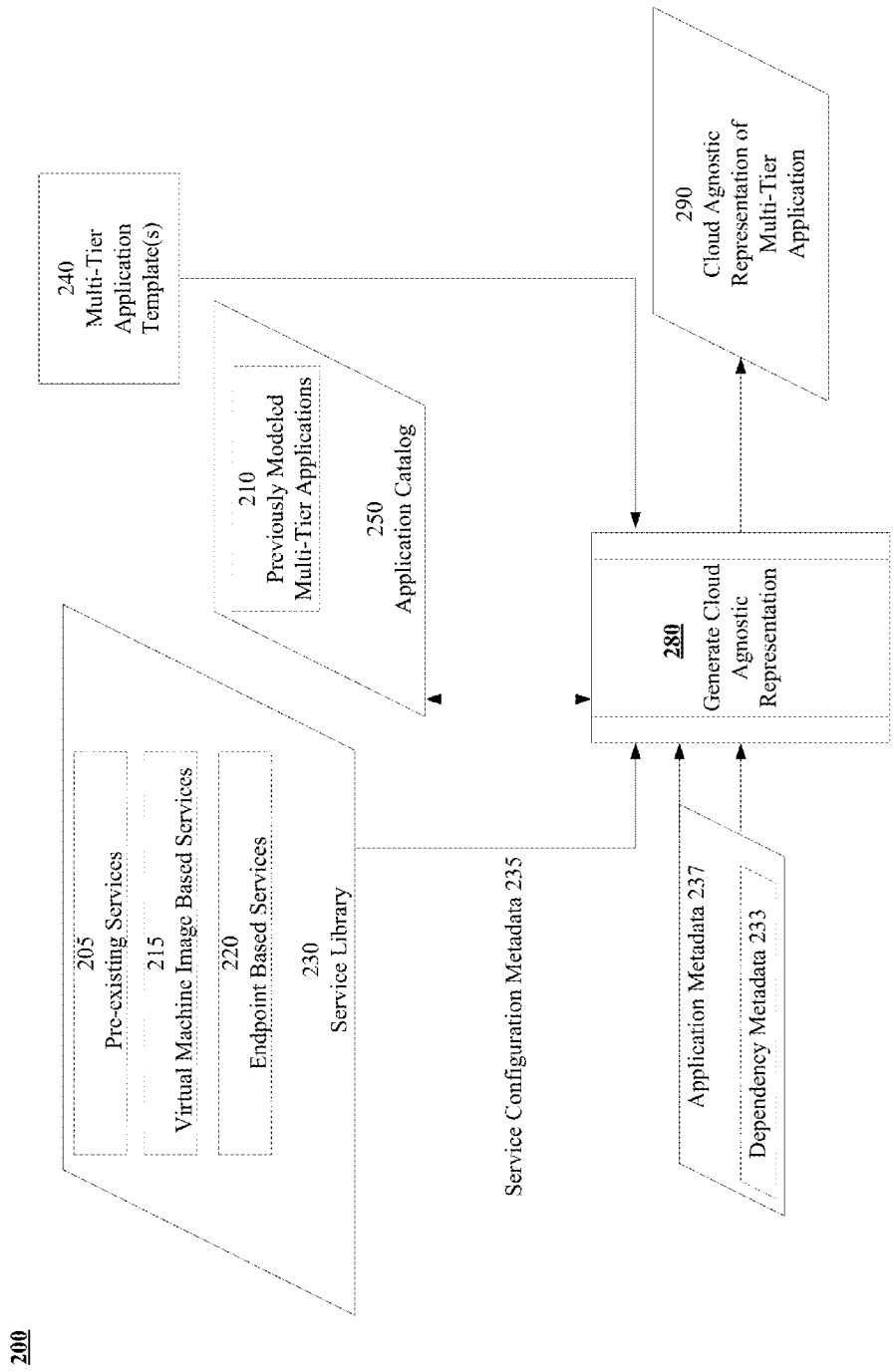
FIG. 2 shows a block diagram of an exemplary system for obtaining cloud agnostic representations of multi-tier applications.

FIG. 2 shows a block diagram of an exemplary system 200 for obtaining cloud agnostic representations of multi-tier applications. In some embodiments, system 200 may comprise Service Library 230, Application Catalog 250, and optionally Multi-tier Application Template(s) 240. System 200 may comprise storage and/or databases with information related to service library 230, application catalog 250, and multi-tier application templates 240. As shown in FIG. 2, in system 200, Generate Cloud Agnostic Representation module 280 may use Service Library 230, Application Catalog 250, and information in multi-tier application template(s) 240 to obtain cloud agnostic representation of multi-tier application 290.

Multi-tier application template(s) 240 may include predefined templates for frequently reused or typical multi-tier applications to facilitate creation of cloud agnostic representations of new multi-tier applications in a manner consistent with disclosed embodiments. As one example, a multi-tier application template 240 may specify one or more available applications from application catalog 250, and/or services from service library 230, and dependency information between some subset of the applications and/or services. The multi-tier application template 240 above may be used and modified by a user to create a new multi-tier application. As another example, multi-tier application template 240 may additionally or alternatively include one or more service categories (e.g. web server, database etc), and any compatible service within that service category may be selected and plugged in to the multi-tier application template 240. In general, multi-tier application template(s) 240 may comprise some combination of available components, service categories and a subset of application metadata associated with a multi-tier application.

Application catalog 250 may include one or more previously modeled multi-tier applications 210 and any application metadata associated with the multi-tier application 210. In general, an application may include services and/or other nested applications. Application metadata associated with multi-tier application 210 may include configuration information for multi-tier application 210 and other metadata related to components of multi-tier application 210 in application catalog 250. The term "component", when used in conjunction with a first multi-tier application refers to service(s) or a nested multi-tier application(s) that form part of the first multi-tier application.

Application catalog 210 may facilitate use of previously modeled applications 210 to create new applications and/or update a previously modeled application. For example, one or more previously modeled applications 210 in application catalog 250 may be updated by the addition and/or removal of one or more services.

As another example, a new application may be created by: (i) selecting a previously stored application from previously stored applications 210 in the application catalog; (ii) modifying the selected application by adding one or more services from service library 230; and/or (iii) removing one or more services from the selected application (iii) adding one or more previously stored applications from application catalog 250; and/or (iv) removing one or more previously stored applications from the selected application and (v) updating or obtaining dependency metadata 233 and other application metadata 237 for the modified application information and (vi) saving the modified application. In some embodiments, the newly created multi-tier application may then be stored in the application catalog 250 as a new application.

In some embodiments, some subset of the information in the newly created multi-tier application may be saved as a template. In one embodiment, information related to service categories and dependencies between the categories associated with the multi-tier application may be exported or saved as a template in multi-tier application templates 240. The template may be used to facilitate creation of new applications. For example, a multi-tier application template "X" for a newly created multi-tier application "A" may be obtained by replacing each service in the newly created multi-tier application A with a service category corresponding to that service while maintaining dependency information. Multi-tier application template X may then be saved to multi-tier application templates 240. In the example above, when template X is used to create another multi-tier application "B", the any appropriate service from within a service category present in template X may be used to replace the service category in template X with an actual service.

In some embodiments, as shown in FIG. 2, service library 230 may include services such as pre-existing services 205, end-point based services 220, and virtual machine images (VMIs) 215. In some instances, endpoint based services 220 may be external endpoint based services (e.g. Amazon RDS). FIG. 2 shows some categories of available services. The services are categorized merely for descriptive and explanatory reasons.

In general, services in service library 230 may include any combination of services selected from various available services. Further, each service in service library 230 may be associated with corresponding service configuration metadata 235, which may include dependency, and/or residency metadata, and/or other configuration settings for the corresponding service. Service configuration metadata associated with services that are part of an application may be used, at least in part, by generate cloud agnostic representation module 280 to obtain cloud agnostic representation of multi-tier application module 290.

In some embodiments, service library 230 may be extensible, in that one or more additional services may be added to services library. In some embodiments, an application developer may specify one or more services (e.g. endpoint services that may be available from a vendor) to be added to service library 230. In another embodiment, system 200 may include one or more modules that may periodically check specified resource locations for new services and/or updated versions of existing services, which may be added or selected for addition to service library 230. In some embodiments, service library 230, application catalog 250, and/or multi-tier application template 240 may be stored and accessed by Generate Cloud Agnostic Representation module 280 to derive cloud agnostic representation of multi-tier application 290.

In some embodiments, service library 230 may facilitate selection from one or more of pre-existing services 205, endpoint based services 210 and/or virtual machine images (VMIs) 215. In some embodiments, VMIs 215 may be stored in a cloud agnostic representation. In some embodiments, a cloud agnostic representation of a VMI may be obtained using techniques disclosed, for example, in co-pending U.S. patent application Ser. No. 14/204,630, entitled "Apparatus, Systems and Methods for Cross-Cloud Application Deployment," which is incorporated by reference in its entirety herein. In some embodiments, new VMI based services 220, which are not currently in Service Library 230, may be added to Service Library 230.

In some embodiments, where new endpoint based services are being added, VMs may not be launched for service endpoints when a multi-tier application that includes the endpoint based service is deployed. For example, for a multi-tier application with an external service endpoint (e.g. such as Amazon RDS), which may be provided in the form of a PaaS, no VMs may be launched when the multi-tier application that includes the endpoint based service is deployed.

In some embodiments, Service Library 230 may store and/or provide service configuration metadata 235 associated with a corresponding service. Service configuration metadata 235 may include configuration and other information for a corresponding service, which may be used, at least in part, by Generate Cloud Agnostic Representation module 280 to generate cloud agnostic representation of multi-tier application 290. The cloud agnostic representation of multi-tier application 290 may include cloud-independent or cloud-agnostic metadata descriptors (hereinafter "metadata descriptors") based, in part, on application metadata 237. Service configuration metadata 235 may include generic information about a service such as name, version, service type, capabilities, service parameters etc. For example, for a Tomcat service, the generic information may include the service name "Tomcat", version "6.0", service type "Java Web Server", etc.

Service configuration metadata information for a service may also include Virtual Machine co-residency information for the service and dependency rules specific to the service. For example, dependency data for the Tomcat service above may specify that it depends on one or more of a database service, frontend and/or backend cache service etc. Further, the dependency metadata may specify that Tomcat cannot co-reside with a load balancing service.

In some embodiments, service configuration metadata 235, which is associated with a service, may include information about the service such as configuration information and service properties, startup, shutdown, migration, backup and/or upgrade information/scripts for the service, the preferred hardware configuration, etc. For example, service configuration metadata 235 may specify service lifecycle related information such as one or more locations to: (i) obtain the service for one or more clouds, (ii) obtain start up, restart, initialization and/or stop scripts, (iii) migration scripts, (iv) upgrade scripts, (v) backup and/or (vi) crash recovery scripts, etc. In some embodiments, the locations may be specified using Uniform Resource Locators (URLs).

Application metadata 237, which may be at an application level, may include global information about the multi-tier application as a whole (which may be composed of components) such as dependency metadata 233 between application components, configuration information and properties, startup, shutdown, migration, backup and/or upgrade information/scripts for the multi-tier application, the preferred hardware configuration for the multi-tier application, etc. In general, application metadata 237 may include some or all of the underlying metadata associated with components of a multi-tier application being modeled.

Dependency metadata 233 may include dependency information for components in the multi-tier application being modeled. For example, the dependency information for a first component of the multi-tier application being modeled may specify one or more other multi-tier application components that the first component may depend upon. Dependency metadata may also include information related to co-residency of components of the multi-tier application being modeled.

In some embodiments, the dependency metadata 233 may be reflected in the metadata for cloud agnostic representation of multi-tier application 290, which may be generated by Generate Cloud Agnostic Representation module 280. The dependency metadata associated with services in a multi-tier application (as reflected in the metadata for cloud agnostic representation of multi-tier application 290) may be used to determine a sequence for start up, initialization and/or a deployment configuration (e.g. VM co-residency and/or VM placement) of the services when the multi-tier application is deployed.

In some embodiments, Generate Cloud Agnostic Representation module 280 may use information in application metadata 237 for a multi-tier application to derive a cloud agnostic representation of the multi-tier application 290. In some embodiments, cloud agnostic representation of multi-tier application 290 may be seamlessly deployed to a plurality of clouds in a manner consistent with embodiments disclosed herein.

Figure 3A:
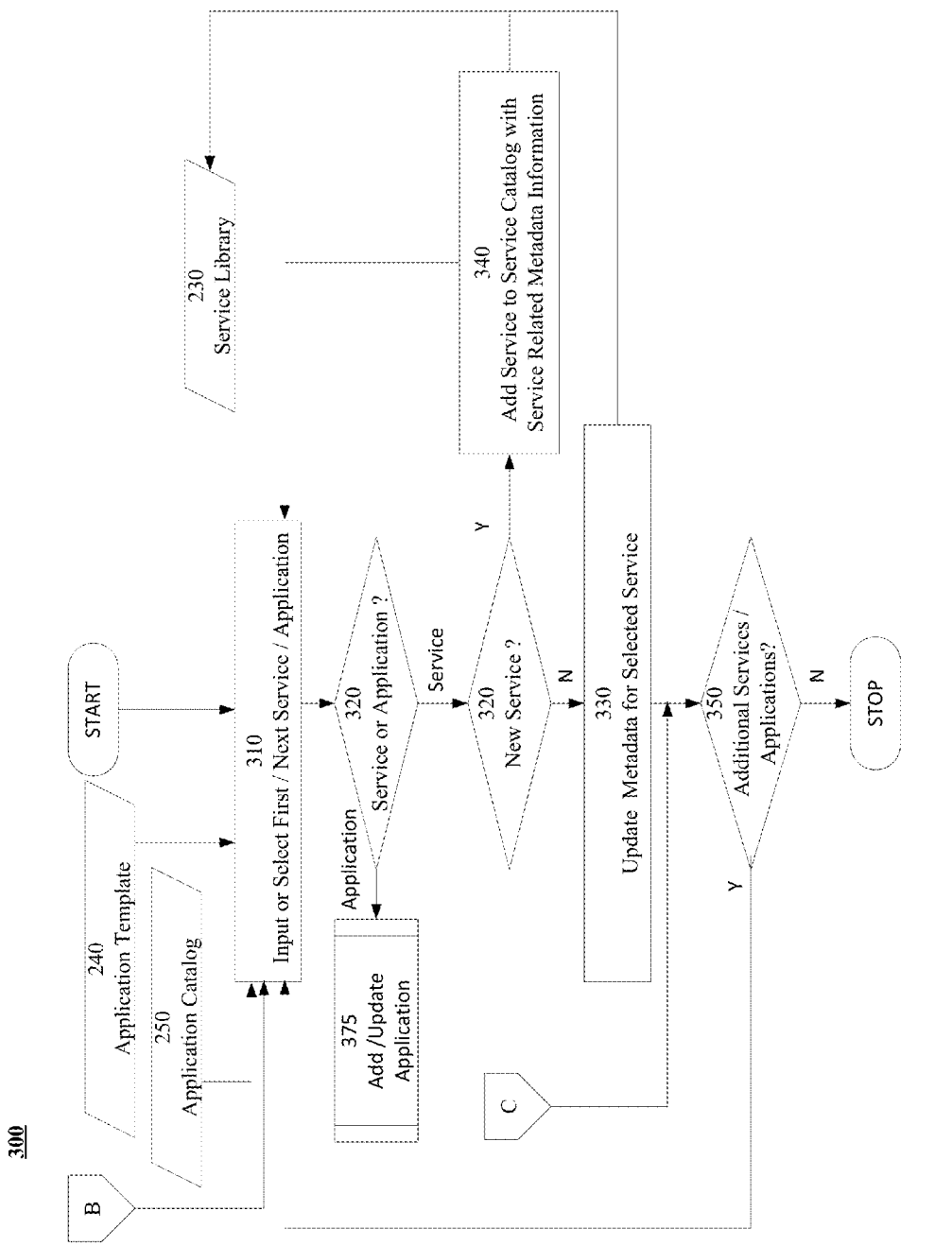
FIGS. 3A and 3B show a flowchart of an exemplary method of building and/or updating the service library and/or the application catalog in a manner consistent with disclosed embodiments.
Figure 3B:
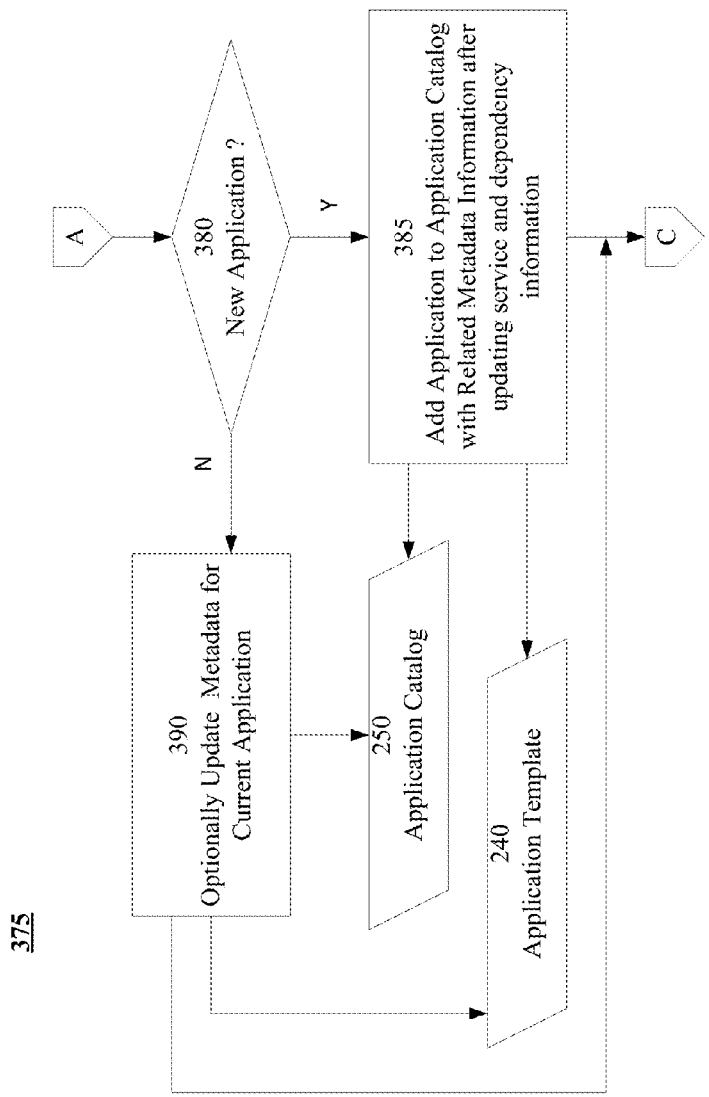

FIGS. 3A and 3B show a flowchart of an exemplary method 300 of building and/or updating service library 230 and/or application catalog 250 in a manner consistent with disclosed embodiments. In some embodiments, distinct subroutines or functional blocks may be used to update service library 230 and application catalog 250. Various modifications to method 300 may be used to accomplish the building and/or updating service library 230 and/or application catalog 250.

In some embodiments, in step 310, the first or next service or application may be input or selected. For example, a service may be selected from service library 230 or an application may be selected from application catalog 250. In some embodiments, a multi-tier application template may be selected from application template(s) 240. In general, in step 310, a new multi-tier application may be input, or a multi-tier application in application catalog 250 may be selected for updating, or a new service may be input, or service library 230 may be updated.

In step 320, if a new application is being input, or an existing application or application template has been selected then Add/Update Application routine 375 may be invoked.

Otherwise, if a new service is being input or a service has been selected from service library 230, then, in step 320, if the service is new (e.g. the service is not currently in service library 230) ("Y" in step 320), then, in step 340 information to create an entry for the service in service catalog 230 may be obtained. For example, a user may input service configuration metadata 235 including a name, description, category, service specific dependency metadata, etc. for the service, and/or information pertaining to the service may be obtained from some specified location/resource (e.g. a URL). In some embodiments, information pertaining to the new service may be optionally added to service library 230.

In step 320, if a service is already present in service library 230 ("N" in step 320), then, in step 330, service configuration metadata 235 associated with the selected service may be optionally updated for the current application. For example, URLs pointing to one or more of installation, startup, shutdown, cleanup, migrate, backup, or upgrade scripts may be updated in service library 230.

In step 350, if there are additional services to be included and/or updated in service library 230 ("Y" in step 350), then, in step 310, a new iteration is commenced. In step 350, if there are no additional services/applications to be included and/or updated, method 300 may be terminated.

In routine 375, in step 380, if a new application is being input (e.g. the application is not currently in application catalog 250) ("Y" in step 380), or an application template has been selected from application templates 240, then, in step 385 information to create an entry for the application in application catalog 250 may be obtained. For example, a user may input application metadata 237 including a name, description, category, application topology/dependency metadata 233, etc. for the application, and/or information pertaining to the application may be obtained from some specified location/resource (e.g. a URL). In some embodiments, information pertaining to the new application may be added to application catalog 250. In some embodiments, the user may be presented with an option to create an application template and store the application template in application templates 240 based on the topology of the new application.

In step 380, if an application is already present in application catalog 250 ("N" in step 380), then, in step 390, application metadata 237 associated with the selected application may be updated prior to storing the updated application in application catalog 250. The method may then proceed to step 350, where it may be terminated or another iteration begun.

Figure 4:
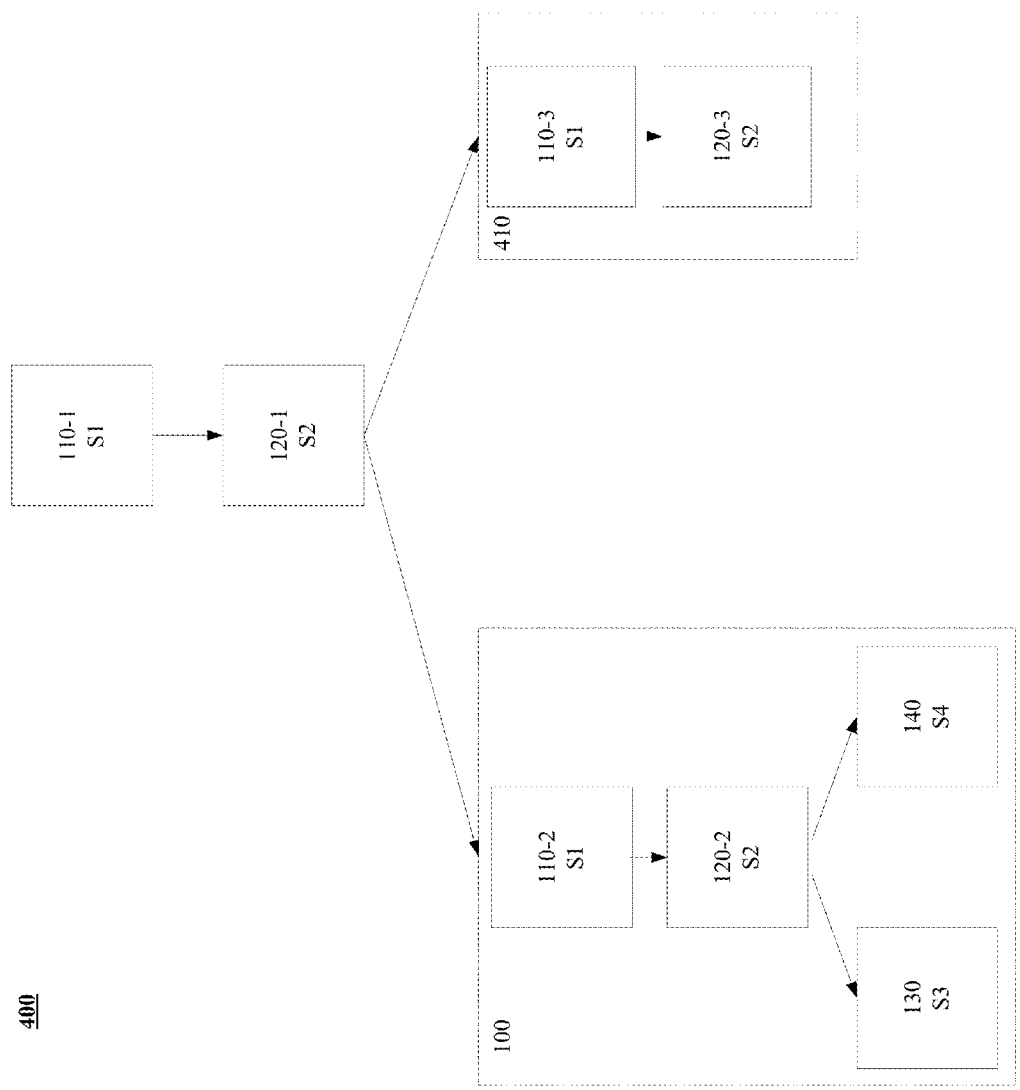
FIG. 4 shows an exemplary multi-tier application composed of other multi-tier applications.

FIG. 4 shows an exemplary multitier application 400 composed of other multi-tier applications. As shown in FIG. 4, multi-tier application 400 includes services S1 110-1, S2 120-1, multi-tier application 100 and multi-tier application 410 as components.

Multi-tier application 100 includes service S2 120-2, which depends on services S3 130 and S4 140. Further, multi-tier application 100 also includes service S1 110-1, which depends on service S2 120.

Further, as shown in FIG. 4, multi-tier application 400 also includes multi-tier application 410. Multi-tier application 410 includes service S2 110-3, which depends on services S2 120-3.

In multi-tier application 400, service S2 120-1 depends on multi-tier applications 100 and 410, while service S1 110-1 depends on service S2 120-1. In instances where application catalog 250 includes multi-tier applications 100 and 410, multi-tier application 400 may be modeled, for example, by selecting services S1 110-1 and S2 120-1 from service library 230, and multi-tier applications 100 and 410 from application catalog and indicating the dependency information shown in FIG. 4. For example, in one embodiment, a user-interface may include icons for services S1 110-1, S2 120-1, and multi-tier applications 100 and 410.

A user may drag and drop the icons and arrows to model the dependency reflected in FIG. 4. In some embodiments, the newly modeled application 400 may be saved to application catalog 250 and/or application templates 240. Thus, in general, disclosed embodiments facilitate modeling of new multi-tier applications (such as application 400) from other applications (such as applications 100 and 410) and services (such as services 110-1 and 120-1) and VMIs (not shown in FIG. 4).

Figure 5A:
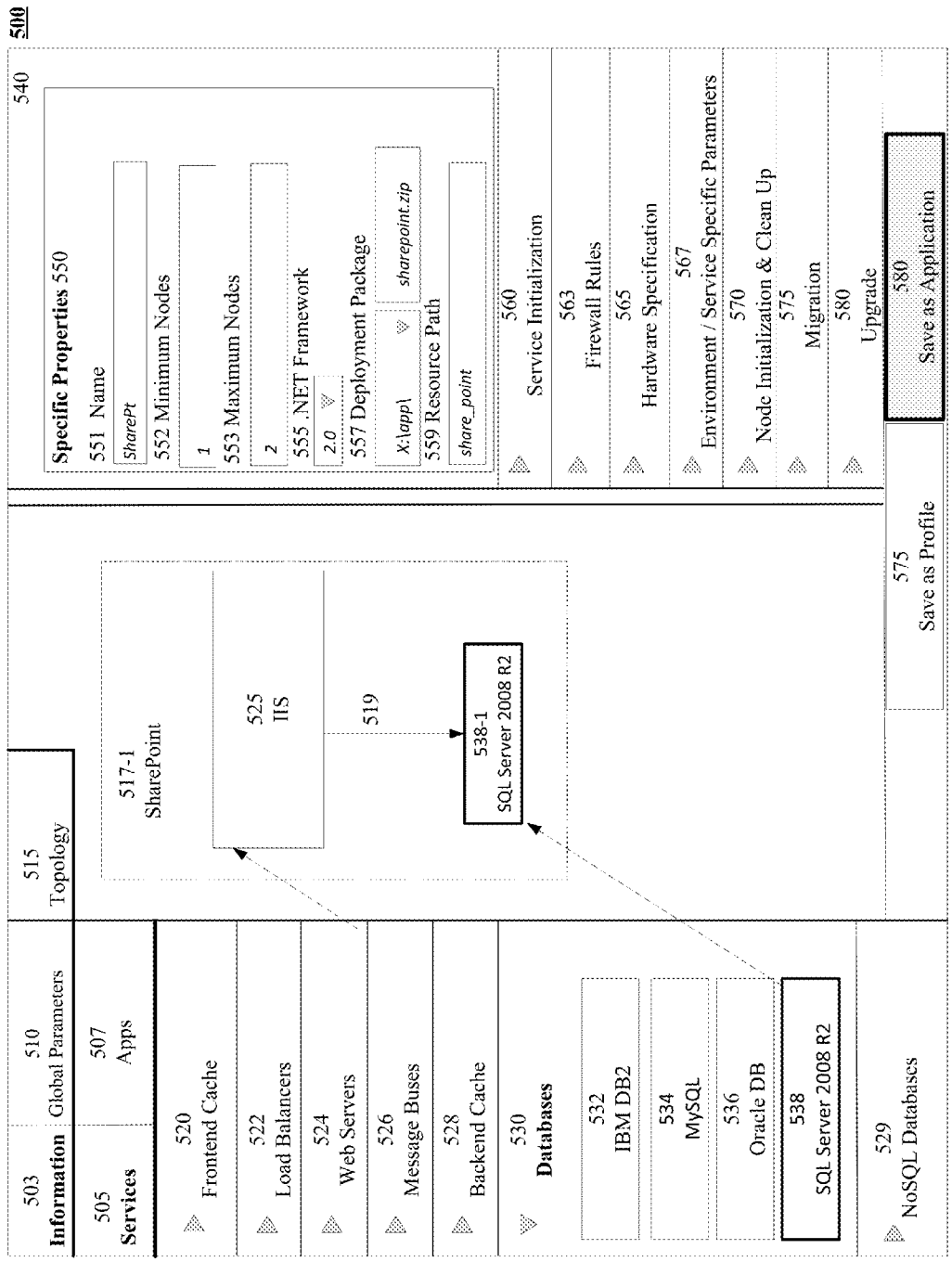
FIG. 5A shows a portion of an exemplary Graphical User Interface (GUI) for a system for obtaining cloud agnostic representations of an exemplary multi-tier application

FIG. 5A shows a portion of an exemplary Graphical User Interface (GUI) 500 for a system for obtaining cloud agnostic representations of an exemplary multi-tier application. In some embodiments, GUI 500 may be displayed to a user to add services to service library 230 and/or applications to applications to application catalog 250 and/or to obtain a cloud agnostic representation of a multi-tier application 290.

In some embodiments, exemplary GUI 500 may be displayed to user during the execution of method 300 and may be used to input, build, modify and/or update services, VMIs and/or multi-tier applications for inclusion in service library 230.

Exemplary GUI 500 may comprise information tab 503, which may include services tab 505 and Applications or "Apps" tab 507. Topology window 515 may display the current services and/or applications included in the multi-tier application and dependency information for the multi-tier application. For example, Services tab 505 shows various options for service categories including for Frontend Cache services 520, Load Balancers 524, Web Servers 526, Message Buses 526, Backend Cache services 528, NoSQL (or non-relational) Databases 529 and Databases 530. Corresponding/similar options may be shown under Apps tab 507 based on the types of applications available in application catalog 250.

In exemplary GUI 500, Databases tab 530 has been selected and available database services IBM DB2 532, MySQL 534, Oracle DB 536 and SQL Server 2005 R2 538 are shown. Specifically, in exemplary GUI 500, Topology panel 515 shows a multi-tier application SharePoint 517-1. SharePoint 517-1 includes component services Internet Information Service (IIS) 525-1, which depends on SQL Server 2008 R2 538-1. For example, IIS 525-1 may have been selected by a user as a service by using Web Servers tab 524, followed by selection of SQL Server 2008 R2 538 (using Databases tab 530) and service dependency information may be modeled/added by using arrow 519 to indicate that IIS service 525-1 depends on depends on SQL Server 2008 R2 service 538-1.

In some embodiments, as shown by the dashed arrows, simple drag and drop operations may be used. Icons representing the available services in service library 230 may be dragged and dropped into Topology panel 515, and arrows may be added between icons to indicate dependencies in order to build a cloud agnostic multi-tier application. In some embodiments, after building multi-tier application SharePoint 517-1, the multi-tier application may be saved as a template in multi-tier application templates 240 using "Save as Template" button 575 and/or as an application in service library 230 using button 580. GUI 500 is merely exemplary and various other techniques may be used to select available services and model and display topology information in Topology panel 515.

Figure 5B:
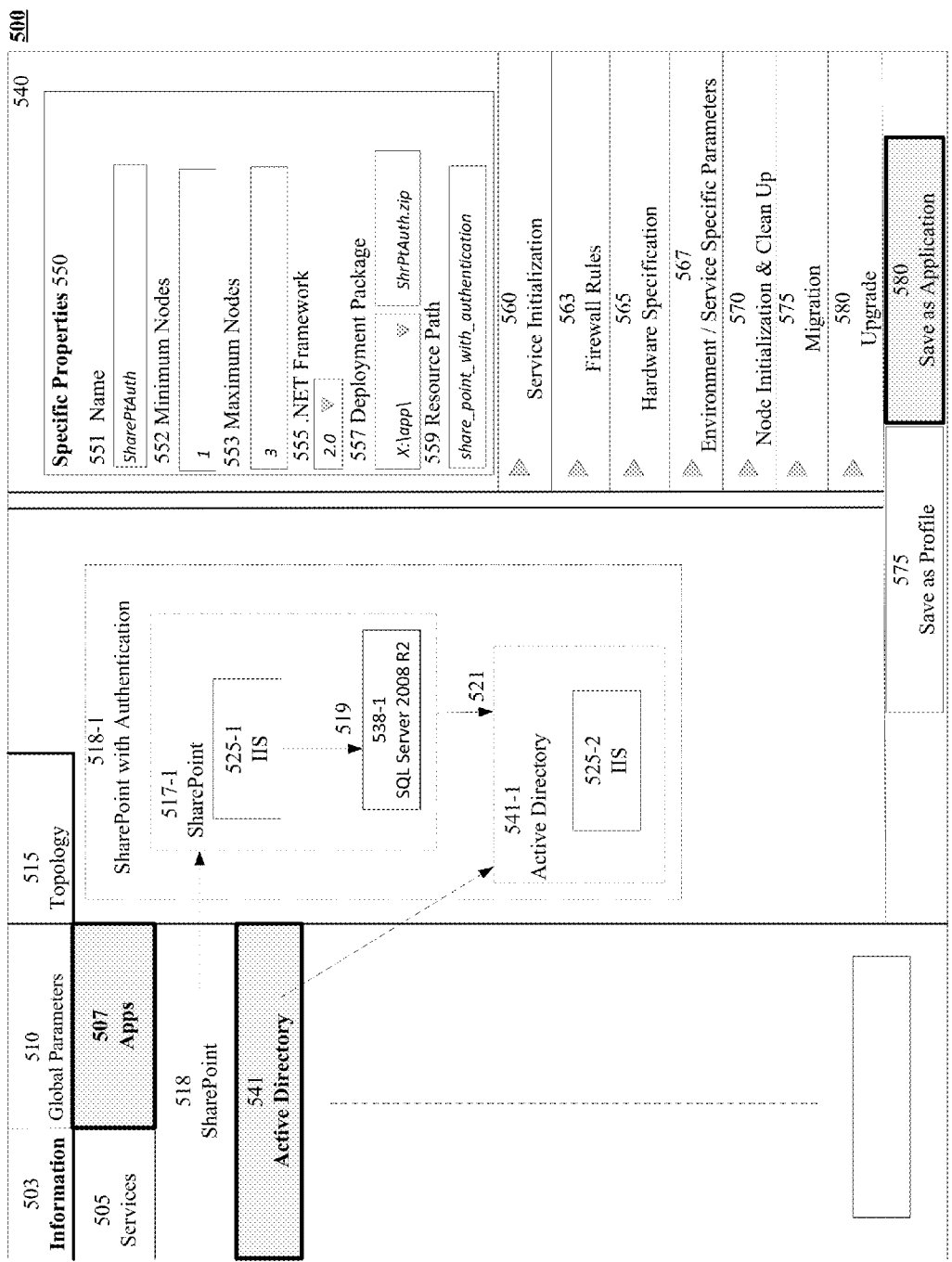
FIG. 5B shows the use of an exemplary GUI to create a new multi-tier application from existing saved multi-tier applications.

FIG. 5B shows the use of GUI 500 create a new multi-tier application SharePoint with Authentication 518-1 from existing saved multi-tier SharePoint applications 517-1 and Active Directory Application 541. As shown in FIG. 5B, multi-tier SharePoint application 517 and Active Directory Application 541 are listed in the Application Catalog 250 and shown in GUI 500 under Apps tab 507. Active Directory application 541, which includes IIS service 525-2, may have been previously created and saved to Application Catalog 250.

To create a new multi-tier application SharePoint with Authentication 518-1, multi-tier SharePoint application 517-1 may be dragged and dropped into Topology panel 515, followed by dragging and dropping Active Directory application 541 and indicating (as shown by edge 521) that multi-tier SharePoint application 517-1 is dependent on Active Directory application 541-1. Multi-tier application SharePoint with authentication application 518-1 may then be saved as a new application using "Save as Application" button 580.

In some embodiments, user may define global parameters using global parameter tab 510. Global parameters may be visible to all services in a multi-tier application. Example parameters may include Simple Mail Transfer Protocol (SMTP) parameters such as an "SMTP User Name" and "SMTP Password". The parameters may have a default value and optionally made user visible or editable at the time of application deployment, so that the value of these parameters can be input or modified by the user when deploying the cloud agnostic multi-tier application to the target cloud. In some embodiments, in addition to the global parameters, a user may define some service specific parameters using environment variables/service specific parameter palette 567 in Properties panel 540. Service specific parameters defined using environment variables/service specific parameters palette 567 are visible to the specific service for which the parameters were defined. For example, service specific parameters defined for Microsoft Sharepoint 517-1 service may be visible to the Microsoft Sharepoint 517-1 service but may not be visible to SQL Server 2008 R2 538-1 service or to other distinct services.

As shown in FIG. 5A, exemplary GUI 500 also includes Properties panel 540, which allows users to specify properties for multi-tier applications. In some embodiments, Properties panel 540 may include service initialization palette 560, firewall rules palette 563, hardware specification palette 565, environment variables/service specific parameters palette 567, node initialization and clean up palette 570, migration palette 575 and upgrade palette 580.

Properties panel 540 may also include specific properties palette 550, which may facilitate specification of properties specific to a service such as, for example, a Name 550 for the service, minimum number of nodes 552 to run the service (shown as 1 in FIG. 5), maximum number of nodes 553 to run the service (shown as 2 in FIG. 5), the .NET framework 555 (shown as 2.0 in FIG. 5), the deployment package 557 (shown as "sharepoint.zip") and resource path (shown as share_point, which may take the form of an environment variable).

Figure 5C:
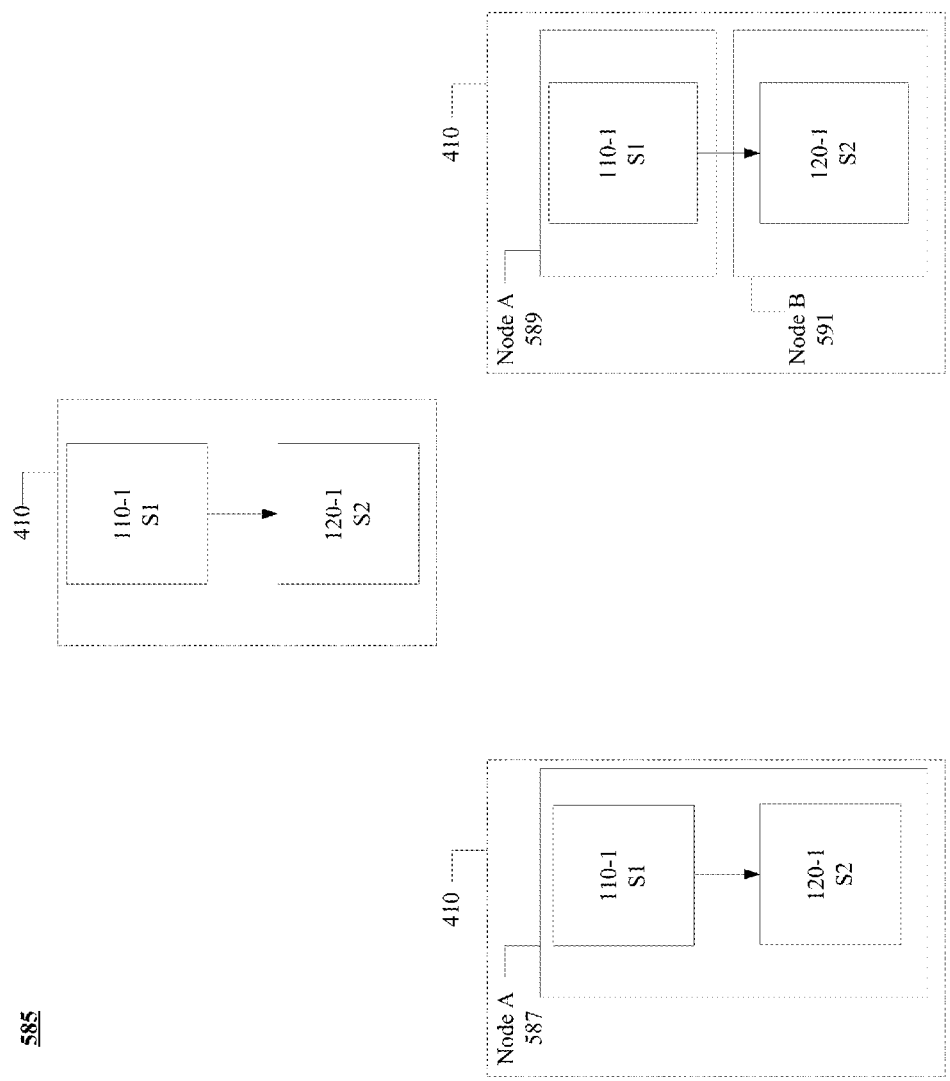
FIG. 5C shows a visual representation of virtual machine co-residency information associated with a multi-tier application.

FIG. 5C shows a visual representation 585 of VM co-residency information associated with a multi-tier application. As shown in FIG. 5C, multi-tier application 410 includes service S1 110-1, which depends on service S2 120. Multi-tier application 410 is shown in FIG. 5B by dashed lines enclosing services S1 and S2. In some embodiments, GUI 500 may include icons for services S1 110-1, S2 120-1, and may use various visual representations such as dashed lines, color coding, etc to indicate the services and/or other multi-tier applications that form part of another multi-tier application.

When a user indicates or updates VM co-residency information related to components of a multi-tier application GUI 500 may be updated to reflect the co-residency information. For example, as shown in FIG. 5B, a user may use GUI 500 to specify that when multi-tier application 410 is deployed, services 110-1 and 120-1 will be co-resident on a single node or VM shown as "Node A" 587 in FIG. 5B. Accordingly, based on the residence dependency information, GUI 500 may be updated to indicate the VM co-residency metadata. For example, by showing a box around services 110-1 and 120-1.

As another example, a user may specify that services 110-1 and 120-1 are to be run on different nodes, or alternatively, that services 110-1 and 120-1 cannot be co-resident on a single node. Accordingly, based on the residence dependency information, GUI 500 may be updated to indicate the VM co-residency metadata. For example, by showing a box around service 110-1 and another around service 120-1.

In some embodiments, the residency dependence information specified using GUI 500 may be used to create application metadata 237, which may be reflected in cloud-agnostic representation of multi-tier application 290. When a multi-tier application is deployed, a corresponding cloud-agnostic representation of the multi-tier application 290 may be used to determine the number of nodes/VMs used to run components of the multi-tier application. Further, appropriate cloud-specific commands (for the cloud on which the multi-tier application is being deployed) derived from the cloud-agnostic representation of the multi-tier application 290 may be used to deploy the multi-tier application and component services on the cloud.

Accordingly, in a first instance, for example, in a development environment, application 410 may be run on node A 587, while, in a second instance, for example in a production environment, application 410 may be run with service 110-1 on node A 587 and service 120-1 on node B 591. Further, in accordance with the dependency information, service 110-1 may be started after the initialization of service 120-1. Thus, VM boundaries may be specified around services and/or applications that form part of a multi-tier application.

Further, in some embodiments, some services in service catalog 230 may be associated with service configuration metadata 235 that includes a "scalable" or "clusterable" descriptor. The clusterable descriptor may specify a minimum (e.g. as shown in and maximum cluster size, which may be used to bound the number of VMs/nodes that the service runs on. For example, a minimum or maximum cluster size may be set for scalable web server service Tomcat 7. When an application with the Tomcat 7 service is launched a runtime GUI may be provided to dynamically scale the application up or down by adding or removing VMs in a range from minimum cluster size to maximum cluster size. For example, the automatic scaling of services may be driven by CPU load policies, load balancer input, VM availability, price-performance ratios, cost considerations, etc.

In general, a user may specify placement/residency and/or co-residency information for a subset of the plurality of component services and/or applications in a multi-tier application. The placement or residency information may specify a mapping of components of a multi-tier application to one or more virtual machines for running those components. Co-residency information may specify (i) components that may not be co-resident and/or (ii) components that are to be co-resident on a VM/node when the multi-tier application is deployed.

Referring to FIG. 5A, the options shown in specific palette 550 may be varied based on the specific service, VMI or application in question. For example, for one service, specific properties pallet 550 may show a "minimum number of nodes" option, while for another service, a "password" option may be shown. Accordingly, the options shown in specific properties pallet 550 may vary depending on the service, VMI and/or application.

In some embodiments, some of the underlying functionality associated with GUI 500 may be provided by a "topology builder" module. In some embodiments, the topology builder and/or another functional module may parse service configuration metadata 235 to render all service specific configuration parameters in GUI 500 dynamically. The service specific configuration parameters may be specified in a variety of ways using GUI 500 including text fields, text areas, number fields, dropdowns, checkboxes, etc. In addition parameters may be associated with attributes such as a default value (e.g. default value of the parameter), optionality (whether the parameter is optional), visibility (whether the value of the parameter is visible to the user), editability (whether a field is editable), etc. Using the parameter information specified in the service descriptor, the system can dynamically generate service specific fields such as GUI 500 that conforms to these specifications.

Further, in some embodiments, service configuration metadata 235 may specify ingress/egress rules, which may specify disallowed service interconnects. For example, the ingress/egress rules may specify that Tomcat 7 may be connected to the MySQL database service, while Java Messaging Service (JMS) messaging buses such as ActiveMQ may not be connected to the MySQL database service. Thus, the topology builder may ensure that a multi-tier application conforms to any constraints expressed in service configuration metadata 235.

In some embodiments, one or more parameters specified using GUI 500 may be used to create service configuration metadata 235 and/or application metadata 237, which may be reflected in cloud-agnostic representation of multi-tier application 290. In some embodiments, deployment package palette 557 may specify a path to the cloud-independent or cloud agnostic representation of the multi-tier application. The cloud agnostic representation of the multi-tier application is used to derive a cloud-specific application for the cloud on which the multi-tier application is being deployed or run. Deployment package 557 may include program code and other information along with a cloud agnostic representation of the multi-tier application. Based on information in the deployment package, including the cloud agnostic representation, a multi-tier application corresponding to the cloud agnostic representation may be instantiated on the selected cloud in conformance with the specified dependencies and properties.

Service initialization palette 560 may facilitate specification of scripts to be run before and/or after a service is started and/or stopped. Firewall rules palette 563 may facilitate specification of inbound rules pertaining to traffic (e.g. inbound traffic) permitted through a firewall. Hardware specification panel 565 may be used to specify a recommended set of physical resources such as the physical number of CPUs, memory, network bandwidth, storage etc for running a service. In some embodiments, hardware specification panel 565 may be used to specify a minimal set of physical resources to run a service and/or a range (minimum/maximum) set of resources to run the service.

Environment variables/parameters palette 567 may used to specify environment variables and/or parameters for a service. In some embodiments, the environment variables and/or parameters may be specified using files, or via other forms of input prior to each launch. Node Initialization and Clean Up palette 570 may be used to specify any other packages to be installed in addition to deployment package 557, and to specify initialization and clean up scripts at the node level. In some embodiments, the initialization and cleans up scripts may be invoked prior to service startup and/or after the service terminates.

Migration panel 575 may specify backup and/or restore scripts when an application is migrated across clouds. For example, the scripts may save a multi-tier application state and/or commit and backup database transactions when stopping and migrating an application. Applications may be migrated, for example, as part of a planned migration to another cloud, because of cloud pricing, performance, cloud availability and/or for other reasons. In some embodiments, because of the cloud agnostic representation 290 of the multi-tier application, the application may be seamlessly migrated after execution of any specified migration related scripts. Upgrade palette 580 may optionally specify any pre-upgrade and/or rollback scripts to be executed prior to upgrading a service.

In some embodiments, based on the dependencies and properties specified in GUI 500 for an application, a cloud agnostic representation 290 of multi-tier application may be generated by generate cloud agnostic representation module 280. As discussed above, one or more parameters specified using GUI 500 may be used to create service configuration metadata 235 and/or application metadata 237, which may be reflected in cloud-agnostic representation of multi-tier application 290. In some embodiments, a multi-tier application may be deployed on a plurality of clouds based on cloud agnostic representation 290 of the multi-tier application.

FIG. 6 shows a flowchart for an exemplary method 600 for obtaining cloud agnostic representations of a multi-tier applications. In some embodiments, method 600 may be performed on a computer or embodied as program code on a computer-readable medium.

In step 605, a multi-tier application template may be optionally selected from available multi-tier application templates 240. The application template may provide various pre-defined/stored templates for modeling multi-tier applications.

In step 610, the first or next service may be selected as a component of a multi-tier application and added to the services comprising the application. In some embodiments, the service may be selected, for example, from service library 230 and/or by adding a new service.

In step 620, any other services that the most recently added service depends on may be specified. For example, GUI 500 and/or topology panel 515 may be used to indicate any dependencies of the most recently added service to one or more other services. If one or more of these other services (upon which the most recently added service depends) has already been added to the multi-tier application, then the dependency information may be updated to reflect the dependencies.

In step 625, if there are additional services to be added to the multi-tier application ("Y" in step 625), then, a new iteration is begun in step 610. If there are no additional services to be added to the multi-tier application ("N" in step 625), then, in step 630, application level properties and configuration information may be specified. For example, panel 540 in GUI 500 may be used to specify application level properties and configuration information.

In step 640, cloud agnostic representation 290 of multi-tier application may be obtained, in part, by using the dependency information, properties and configuration information. In some embodiments, the cloud agnostic representation 290 of multi-tier application may include application metadata 237, wherein the application metadata 237 is based, in part, on the dependency information, properties, parameters, and configuration information for the multi-tier application. In some embodiments, a first multi-tier application may include components such as services (including VMIs and endpoint based services) as well as (nested) multi-tier applications. Application metadata 237 associated with the first multi-tier application may be derived, in part, from metadata (dependency information, properties, parameters, and configuration information etc) associated with the component services and component multi-tier applications of the first multi-tier application.

In some embodiments, the cloud agnostic representation 290 of multi-tier application may include a representation of application metadata 237 and/or system and pattern primitives, which describe the execution pattern and dependencies. In some embodiments, the cloud agnostic representation 290 may further include commands that dynamically configure the multi-tier application based on the cloud agnostic representation 290 of multi-tier application for a specific cloud that the multi-tier application is being deployed. For example, in one embodiments, the cloud agnostic representation may facilitate: (i) automatic downloading of executables for the various services for cloud that the multi-tier application is being deployed on; (ii) configuration of the multi-tier application and component services based on the specified properties; and (iii) starting, in a sequence, conforming to the specified dependencies component services of the multi-tier application.

Figure 7:
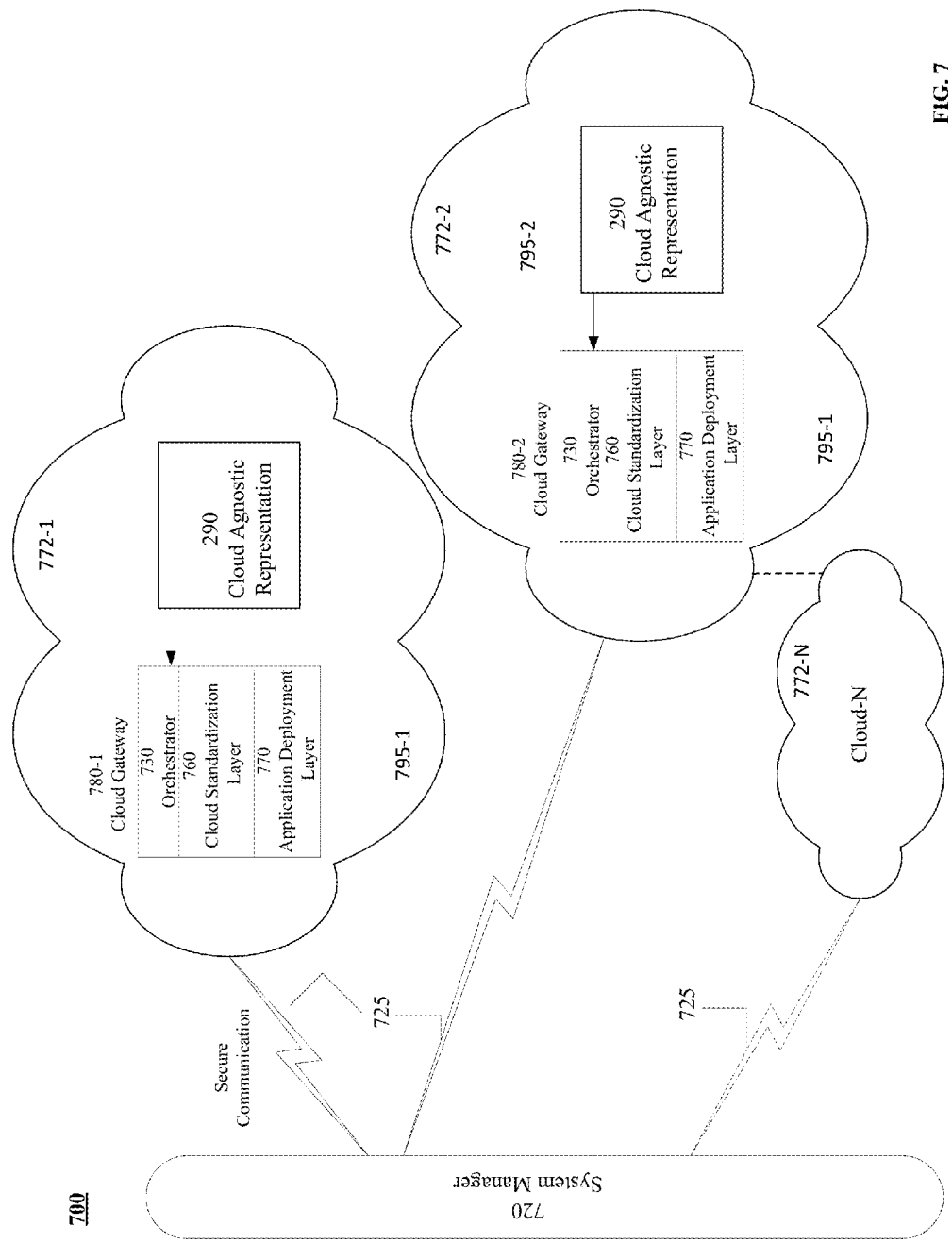
FIG. 7 shows an exemplary system for deploying cloud agnostic representations of a multi-tier application on a plurality of clouds in a manner consistent with disclosed embodiments

FIG. 7 shows an exemplary system 700 for deploying cloud agnostic representations of a multi-tier application on a plurality of clouds in a manner consistent with disclosed embodiments.

System 700 shown in FIG. 7 is used merely exemplary and is used to illustrate the operation of some disclosed embodiments. Techniques and embodiments disclosed may also be deployed and/or used in conjunction with various other cloud-based architectures and/or distributed computing systems. As shown in FIG. 7, system 700 may include System Manager 720, Orchestrator 730, Cloud Standardization Layer 760, Application Deployment Layer 770, and Cloud Gateway 780.

System 700 may also include one or more clouds, which are shown as Clouds 772-1, 772-2 . . . 772-N and collectively referred to as Clouds 772. Clouds 772 may communicate with at least one System Manager 720 using communication links 725. Communication links 725 may permit secure communication between System Manager 720 and one or more of Orchestrator 730, Cloud Standardization Layer 760, Application Deployment Layer 770, and/or Cloud Gateway 780. System Manager 720 may be in communication with one or more clouds 772-i at any time.

System 700 may also comprise cloud agnostic representations 290 of a multi-tier application, which may be used to obtain a cloud specific implementation of the multi-tier application. For example, cloud agnostic representation 290 of a multi-tier application may be used to obtain a cloud specific implementation for Cloud 772-1 and another (different) cloud specific implementation of the multi-tier application for cloud 772-2. System 700 may facilitate deployment, transformation and migration of cloud agnostic representations 290 of a multi-tier application in a manner consistent with disclosed embodiments.

In some embodiments, System Manager 720 may manage application topology information and coordinate with Orchestrator 730. For example, System Manager 120 may receive, maintain, and update dependency and configuration information, cloud information, application related information (e.g. application profile) and other data such as job history, policies, etc. In some embodiments, System Manager 720 may provide information about the application being deployed. In some embodiments, System Manager 720 may also facilitate user views of application files and data on shared storage, may move the application files and data to cloud storage, and provide functionality to synchronize the application files and data between clouds.

In some embodiments, System Manager 720 may serve as a storehouse and manager of information pertaining to user activities. For example, System Manager 720 may act as a management layer to initiate and manage application deployment and monitoring activities.

In addition System Manager 720 may also manage automated tasks, which, in some embodiments, may have been initiated by Orchestrator 730. System Manager 720 may also call or invoke functions implemented by Orchestrator 730 in order to perform various system related activities. In some embodiments, System Manager 720 may maintain a relational database or data repository with information pertaining to system users including user authentication and authorization information; a list of clouds (772-1, . . . 772-N) and available cloud configurations for each cloud 772-i; information pertaining to applications/entities; policies that a user may have specified, etc.

In some embodiments, Orchestrator 730 may use a common application representation, such as cloud agnostic representation 290 of a multi-tier application, to deploy and run a given multi-tier application on any cloud, irrespective of implementation differences pertaining to the provisioning and utilization of application resources on the individual clouds, in part, by using functionality provided by Cloud Standardization Layer 760.

In some embodiments, Cloud Standardization Layer 760 may include functionality to facilitate standardization of library constructs (such as shared storage, network, cluster, security, etc.) across a variety of cloud providers. Although cloud providers may have provider-specific Application Programming Interfaces (APIs) and other infrastructure differences, Cloud Standardization Layer 760 may provide applications a cloud agnostic or a cloud infrastructure-independent view of resources, including compute, storage and network resources. For example, Cloud Standardization Layer 760 can be a repository for various functional modules that permit applications to utilize various resources (including shared storage, server types, clusters and features such as queues, security, etc.) on each cloud in a cloud-agnostic manner.

In some embodiments, Cloud Standardization Layer 760 may maintain resource standardizations for various clouds, such as exemplary clouds 772-1, 772-2 . . . 772-N, as well as references to cloud-specific implementations of the standardizations for clouds 772. In some embodiments, exemplary Cloud Standardization Layer 760 may also maintain service-level agreements (SLAs), capability information about each cloud resource, information pertaining to cloud availability, reliability, and security, and performance and pricing information. Information may be maintained by Cloud Standardization Layer 760 by using metadata XML files or databases, which, in some implementations, may be persistent. In some implementations, the capability information can be stored as {key, value} pairs in a database. Because individual clouds may have different capabilities for a standardized resource type, capability information may be indexed by cloud.

In some embodiments, the common application representation may take the form of application descriptors (not shown) such as pattern and system primitives, which may be input to Orchestrator 730. The pattern and system primitives may describe the execution patterns as well as node, storage, communication and network characteristics pattern and system primitives. Exemplary application descriptors can include information such as: application software and hardware requirements, application profile (whether memory intensive, Input-Output intensive, CPU intensive, etc.), specification of a distributed computing paradigm, application steps (for workflow style applications). Exemplary embodiments of these primitives, Orchestrator 730, and cloud coordinator/gateway 780 have also been described in co-pending U.S. patent application Ser. No. 13/024,302 filed Feb. 9, 2011, entitled "Apparatus, Systems and Methods for Deployment and Management of Distributed Computing Systems and Applications," which has been incorporated by reference in its entirety into the present application. Further, the common application representation may also include one or more cloud agnostic representation of VMIs using techniques disclosed, for example, in co-pending U.S. patent application Ser. No. 14/204,630, entitled "Apparatus, Systems and Methods for Cross-Cloud Application Deployment," which has also been incorporated by reference in its entirety herein.

In some embodiments, Orchestrator 730 may facilitate the deployment, running, and monitoring of applications on various clouds. For example, Orchestrator 730 may dynamically launch cloud agnostic representations 290 of a multi-tier application on a selected cloud 772-*i* for multi-tier application execution in response to an execute command entered by a user.

Orchestrator 730 may also maintain routines and other program code that implement algorithms for deploying, optimizing, managing and monitoring application runs on clouds. In some embodiments, routines and other functions performed by Orchestrator 730 may be managed and initiated by the System Manager 720. Orchestrator 730 may also report back the status and results of the various orchestration activities to System Manager 720. In one embodiment, Orchestrator 730 may directly query System Manager 720 for information such as application data, policies, and cloud information.

Tasks performed by Orchestrator 730 on Clouds 772 may be facilitated by Cloud Standardization Layer 760. For example, functionality provided by Cloud Standardization Layer 760 may permit Orchestrator 730 to use infrastructure independent representations of application code, such as cloud agnostic representation 290 of a multi-tier application, to deploy multi-tier applications. In some embodiments, the infrastructure independent or cloud independent or cloud agnostic program code may be common across all clouds 772 because the Cloud Standardization Layer 760 may uses Application Deployment Layer 770, which may comprise cloud specific Plugins, APIs and Cloud Specific Libraries, to perform tasks for Orchestrator 730 on any given cloud 772-*i*.

In some implementations, the deployment and running of applications and the dynamic management of clusters and other cloud resources may be facilitated by Cloud Application Deployment Layer 770.

In some embodiments, the dynamic management of VMs, clusters and other cloud resources may be facilitated by using a node management service running on a "cloud coordinator/gateway" or "cloud gateway" or gateway 780 for a specific cloud 772-*i*. Gateway 780 may also maintain Cloud APIs and Cloud specific Libraries.

Cloud Specific Libraries and Cloud APIs may comprise a library of implementations for primitives and composite interfaces, respectively, for a specific cloud 772-*i*. In some embodiments, Cloud APIs and Cloud Specific Libraries may be invoked using Cloud Plugins. For example, Cloud Plugins may be used to invoke appropriate Cloud APIs and routines from Cloud Specific Libraries that permit the deployment and running of applications on Clouds 772, where the applications may have been described using application descriptors and standardized primitives from Cloud Standardization Layer 760.

In some embodiments, when an application is to be deployed, a gateway 780-*i* may use Cloud APIs and Cloud Specific Libraries to perform deployment and execution tasks for cloud 772-*i*. For example, shared storage primitives on Cloud Standardization Layer 760 may lead to instantiation of a DFS shared storage implementation on an Amazon™ cloud, while instantiating the shared storage implementation on a Terremark™ cloud will set up NAS/SAN.

In some embodiments, gateway 780-*i* may also launch one or more agents (not shown), which can be deployed on Cloud 772-*i*. In some embodiments, functionality specified or configured by the user may be implemented by gateway 780, Orchestrator 730, and/or Cloud Application Deployment Layer 770, which, in some implementations, may include software agents running on the various clouds 772. These software agents may monitor application runtime statistics, collect cloud related information such as but not limited to cloud load information, pricing information, security information etc., and/or collect information related to VMs and/or user actions.

In some embodiments, the agents may report the actions performed as well as other task status back to gateway 780-*i*, Orchestrator 730 and/or System Manager 720. For example, in one embodiment, the agent(s) may collect and/or remove cloud specific VM information (such as cloud initialization and/or other cloud-specific configuration actions) selectively when VM 110-1 is launched on a first cloud 372-1 and may report the collected information pertaining to Cloud Specific layer 140-1 to one or more of gateway 380-*i*, Cloud Standardization Layer 360, Orchestrator 330 and/or System Manager 320.

Figure 8:
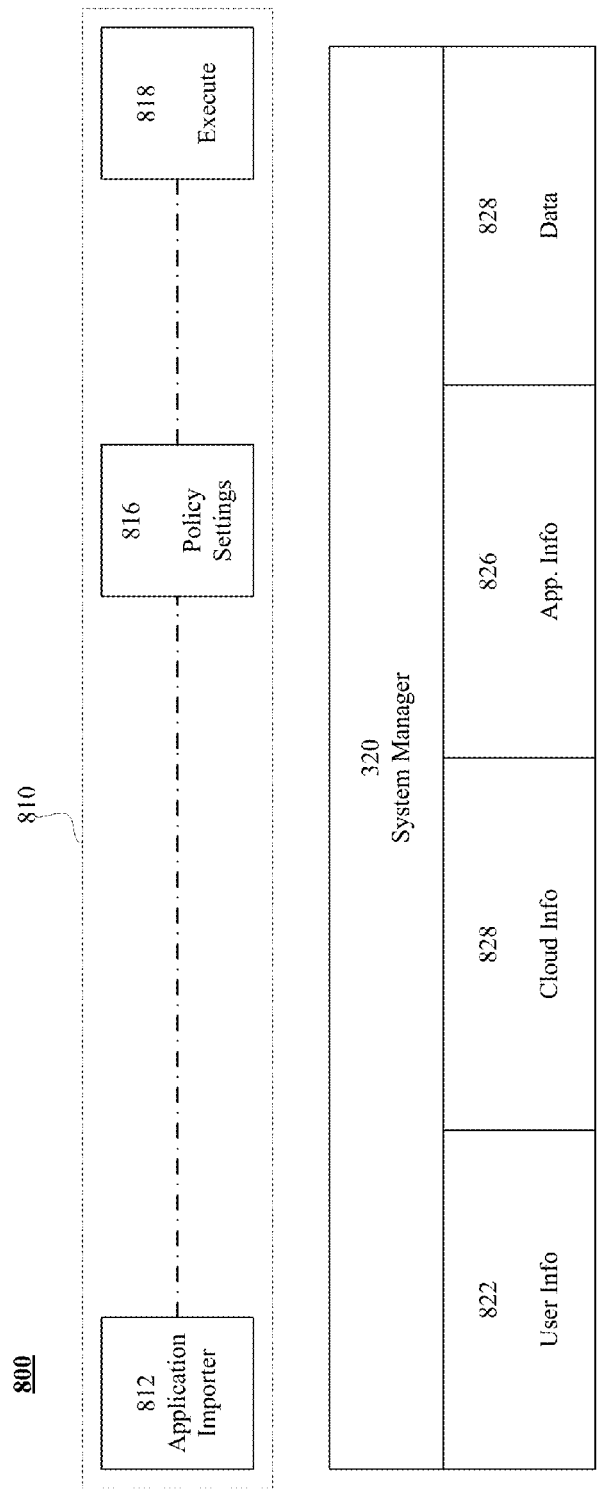
FIG. 8 shows the architecture of exemplary system manager along with other modules and/or layers that interact with the system manager.

FIG. 8 shows the architecture 800 of exemplary system manager 720 along with other modules and/or layers that interact with System Manager 720. In some embodiments, System Manager 720 may interact with exemplary User Interface Layer 810, which, in turn, may facilitate user configuration of system 700. Exemplary User Interface Layer 810 may comprise Application Importer Module 812, Policy Setting Module 816, and Execute Module 818. For example, Application Importer Module 812 may be used to import an application profile and/or to create a cloud agnostic representation 290 of a multi-tier application and the application to application catalog 250, add and/or update services in service library 230, and perform other tasks. In some embodiments, Application Importer Module 812 may use a GUI similar to GUI 500 to perform service library populate/update tasks, and/or to create multi-tier cloud agnostic representations 290 of a multi-tier application. In addition, as indicated by the dashed lines, User Interface Layer 810 may include several other modules (not shown in FIG. 8) to allow users to specify system functionality related to reporting, auditing, billing, and permit viewing of application files and data on shared storage.

Exemplary User Interface Layer 810 may also include various end-user modules that permit user customization and configuration of system 700. Exemplary Application Importer Module 812 may facilitate the importation of new applications and/or the migration of applications, services, and/or images in system 700. In some embodiments, imported applications may be displayed to users using a "desktop-style" view, where icons representing the various applications are shown to the user in a window or browser tab. In some embodiments, pre-published applications or service in a marketplace associated with system 700 (for example, applications in an application library or "app store" associated with or supported by system 700 may be imported by users directly onto their desktop view. In some embodiments, Application Importer Module 812 may allow users to license or buy one or more of pre-published applications or services (e.g. a database service). In general, any software application may be imported using exemplary Application Importer Module 812 in User Interface Layer 810

In some embodiments, Policy Settings Module 816 may provide appropriate graphical user interfaces and other features to permit users to set, modify, and/or delete policies, which may be implemented using a policy engine. For example, users may set policies that limit the clouds and/or configurations that specific user(s) and/or application(s) may use/migrate to, limit the monetary budget available for an application run or a series of runs, etc.

In some embodiments, Execute Module 818 may provide user interfaces to permit users to select a cloud agnostic representation of a multi-tier application and/or a cloud 772-i (from available clouds 772-1, 772-2 . . . 772-N), for execution of the multi-tier application. In some embodiments, the multi-tier application may then be launched on the selected second cloud 772-i.

In addition System Manager 720 may also manage automated tasks, which, in some embodiments, may have been initiated by Orchestrator 730. System Manager 720 may also call or invoke functions implemented by Orchestrator 730 in order to perform various system related activities. For example, System Manager 720 may invoke a secure communications module to facilitate secure communication with a new VM. In some embodiments, System Manager 720 may maintain a relational database or data repository with information pertaining to system users including user authentication and authorization information; a list of clouds (772-1, . . . 772-N) and available cloud configurations for each cloud 772-i; policies that a user may have specified, etc.

In some embodiments, Orchestrator 730 may use a common application or cloud agnostic representation, such as cloud agnostic representations 290 of a multi-tier application, to deploy and run the underlying software and/or multi-tier applications on any cloud, irrespective of implementation differences pertaining to the provisioning and utilization of application resources on the individual clouds, in part, by using functionality provided by Cloud Standardization Layer 760.

For example, cloud agnostic representation 290 of a multi-tier application may be obtained, at least in part, from system configuration metadata 235 and application metadata 237 (which may include dependency metadata 233) and may be used by Orchestrator 730 to deploy and run the underlying multi-tier applications on various clouds.

As one example, service specific network ingress/egress rules specified as part of service configuration metadata 235 for a service may be embodied in cloud agnostic representation 290 of a multi-tier application. The service specific network ingress/egress rules (as embodied in cloud agnostic representation 290 of a multi-tier application) may be used to facilitate network configuration for the service at orchestration. For example, service configuration metadata 235 for MySQL service 534 in an exemplary multi-tier application, may specify an Incoming Port for MySQL service 534 as Port 3306. Further, the ingress/egress rules may specify that components (e.g. services) in tiers that are directly connected to MySQL service 534 may communicate with MySQL service 534. The ingress/egress rules for the exemplary MySQL service 534 may further specify that components (e.g. services) in tiers that are not directly connected to MySQL service 534 may not communicate with MySQL service 534. Accordingly, in some embodiments, orchestrator 730 may use service specific network ingress/egress rules (as embodied in cloud agnostic representation 290 of a multi-tier application) to specify network security policies for the cloud provider (on which the multi-tier application is being deployed) that will allow components in tiers directly connected to MySQL service 534 to connect to port 3306 on the node running MySQL service 534. Further, services in tiers that are not directly connected to MySQL service 534 may be prevented from accessing port 3306 on node running MySQL service 534. In some embodiments, the service ingress/egress rules specified as part of service configuration metadata may be used to enhance network security for the multi-tier application.

In some embodiments, the common application or cloud agnostic representation may take the form of application descriptors (not shown), which may be input to Orchestrator 730. In some embodiments, a user may specify applications to import using Application Importer module 812 and application descriptors, which may include various primitives such as pattern and system primitives, may be used to describe applications to Cloud Standardization Layer 760.

Orchestrator 730 may maintain routines and other program code that implement algorithms for deploying, optimizing, managing and monitoring application and VM runs on clouds. In some embodiments, routines and other functions performed by Orchestrator 730 may be managed and initiated by the System Manager 720. Orchestrator 730 may also report back the status and results of the various orchestration activities to System Manager 720. In one embodiment, Orchestrator 730 may directly query System Manager for information such as application data, policies, and cloud information.

Tasks performed by Orchestrator 730 on Clouds 772 may be facilitated by Cloud Standardization Layer 760. For example, functionality provided by Cloud Standardization Layer 760 permits Orchestrator 730 to use infrastructure independent or cloud agnostic representations of application code, such as cloud agnostic representation 290 of a multi-tier application, to deploy multi-tier applications across clouds. In some embodiments, the infrastructure independent or cloud independent or cloud agnostic program code may be common across all clouds 772 because the Cloud Standardization Layer 760 may use functionality provided by Application Deployment Layer 770 to perform tasks for Orchestrator 730 on any given cloud 772-i. For example, Cloud Standardization Layer 760 may use functionality provided cloud specific Plugins, APIs and Cloud Specific Libraries to perform tasks for Orchestrator 730 on any given cloud 772-*i*.

Figure 9:
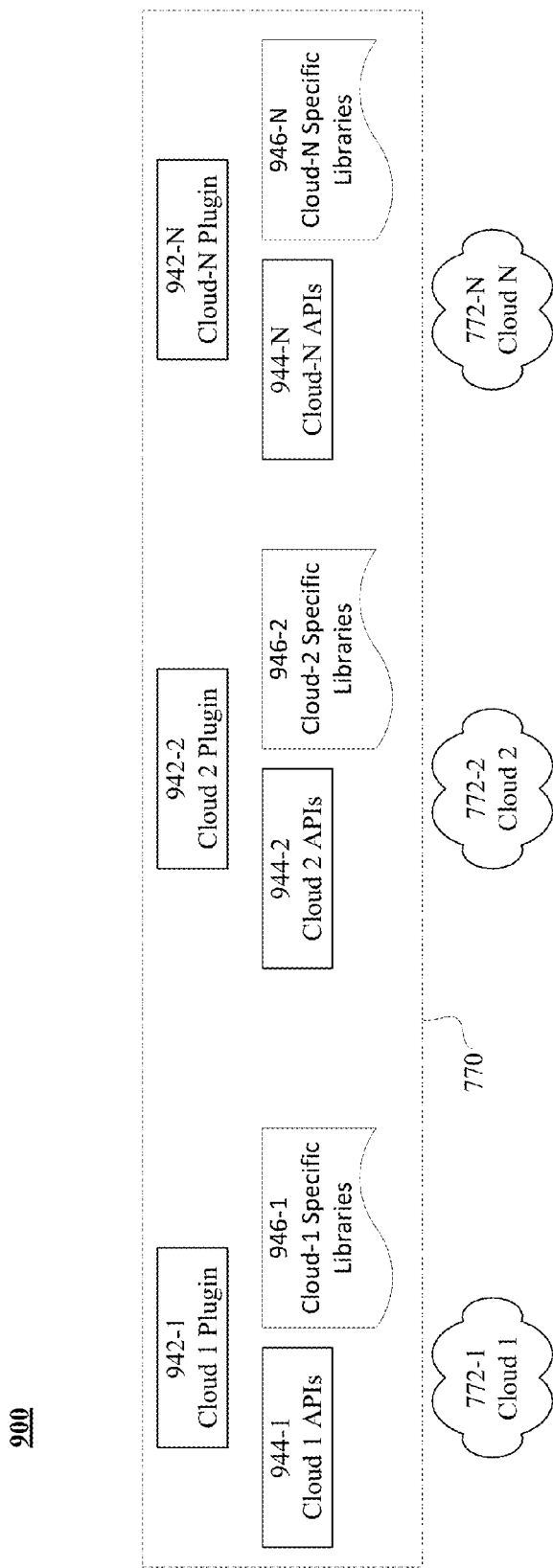
FIG. 9 shows an exemplary architecture of the application deployment layer.

FIG. 9 shows an exemplary architecture 900 of Application Deployment Layer 770. In some implementations, the deployment and running of applications and the dynamic management of clusters and other cloud resources may be facilitated by cloud Application Deployment Layer 770. Cloud Application Deployment Layer 770 may include Cloud Plugins 942, Cloud APIs 944 and Cloud Specific Libraries 946.

In some embodiments, the dynamic management of cloud resources may be facilitated by using a service such as a node management service running on gateway 780-*i* for a specific cloud 772-*i*. Gateway 780-*i* may also maintain Cloud APIs 944, such as Cloud-1 APIs 944-1, Cloud-2 APIs 944-2 . . . Cloud N APIs 944-N. In addition, gateway 780-*i* may also maintain Cloud specific Libraries 946, such as Cloud 1 Specific Libraries 946-1, Cloud 2 Specific Libraries 946-2, Cloud N Specific Libraries 946-N, etc. The node management service may act as an intermediate layer between the cloud provider 772-*i* and the cloud orchestrator 380-*i* and facilitate the addition or removal of nodes.

Cloud Specific Libraries 946 and Cloud APIs 944 may comprise a library of implementations for primitives and composite interfaces, respectively, for a specific cloud 772-*i*. In some embodiments, Cloud APIs 944 and Cloud Specific Libraries 946 may be invoked using Cloud Plugins 942. For example, Cloud Plugins 942 may be used to invoke appropriate Cloud APIs 944 and routines from Cloud Specific Libraries 946 that permit the deployment and running of multi-tier applications on Clouds 772, where the multi-tier applications may have been described using cloud agnostic application descriptors and standardized primitives from Cloud Standardization Layer 760.

In some embodiments, when a VM is to be deployed on a cloud 772, gateway 780 may use Cloud APIs 944 and Cloud Specific Libraries 946 library to perform deployment and execution tasks for that cloud 372. For example, shared storage primitives on Cloud Standardization Layer 760 may lead to instantiation of a DFS shared storage implementation on an Amazon™ cloud, while instantiating the shared storage implementation on a Terremark™ cloud will set up NAS/SAN. In some embodiments, gateway 780 may also launch one or more agents, which can be deployed on nodes on Clouds 772, to monitor and report task status back to gateway 380 and/or to perform other functions.

In some embodiments, functionality specified or configured by the user in User Interface Layer 110 may be implemented by one or more modules in Cloud Application Deployment Layer 170, which, in some implementations, may include software agents running on a server and/or on the various clouds. These software agents may perform specific actions, monitor application runtime statistics, collect cloud related information such as but not limited to cloud load information, pricing information, security information etc., and/or collect information related to VM and/or user actions.

Figure 10:
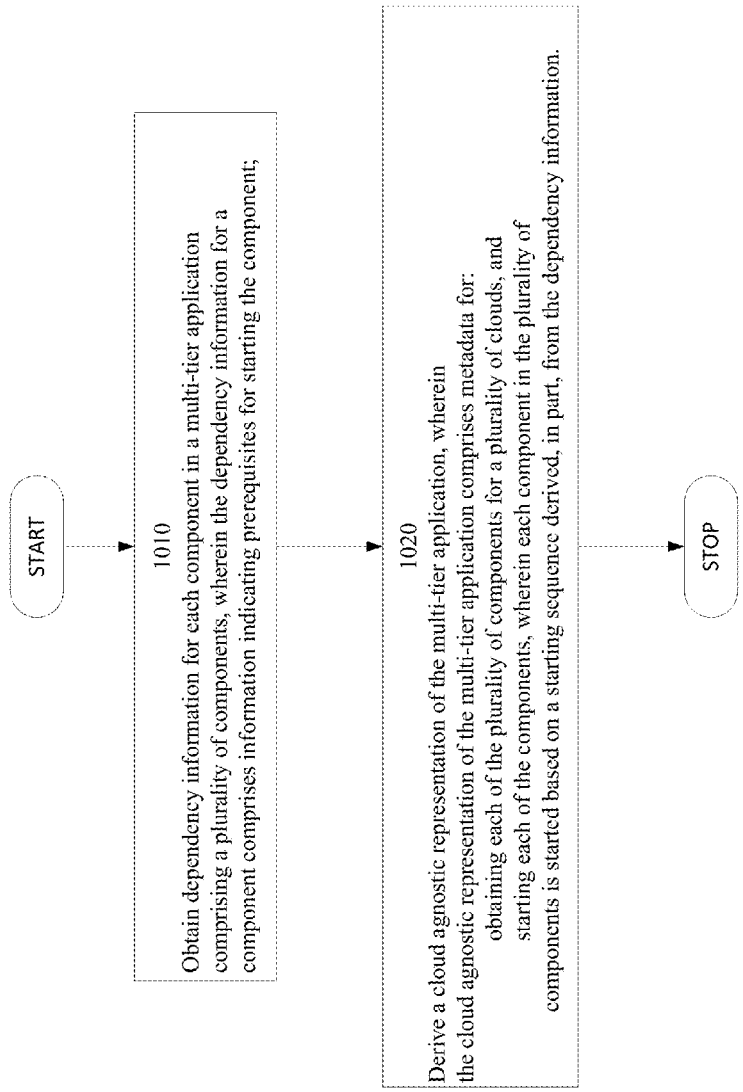
FIG. 10 shows a flowchart for an exemplary method for obtaining a cloud agnostic representation of a multi-tier application.

FIG. 10 shows a flowchart for an exemplary method 1000 for obtaining a cloud agnostic representation of a multi-tier application.

In some embodiments, in step 1010, dependency information for each component in a multi-tier application comprising a plurality of components may be obtained. The dependency information for a component may comprises information indicating prerequisites for starting the component. In some embodiments, the information associated with each component may additionally include information to obtain the component (e.g. a URL associated with the component).

In some embodiments, the dependency information for each component may further comprises residence dependency information and the metadata may further comprise: Virtual Machine (VM) co-residency information for a first subset of the plurality of components when deployed. The VM co residency information may comprise: information indicating the compatibility of at least one first group of components in the first subset for co-residency; or information indicating the incompatibility of at least one second group of components in the first subset for co-residency. Further, the VM residence dependency information may comprise: VM placement information for a second subset of the plurality of components when deployed, the VM placement information comprising a mapping of each component in the second subset to one or more VMs.

In some embodiments, each of the plurality of components may be selected from at least one of: a service library, the service library comprising a plurality of services, wherein each of the plurality of services is associated with a corresponding service configuration metadata; and/or an application catalog, the application catalog comprising a plurality of predefined multi tier applications, wherein each of the plurality of applications is associated with a corresponding application metadata.

In some embodiments, the plurality of services in the service library may comprise at least one of: a web server; a relational database; a non-relational database; a load balancing service; a front-end cache; a back-end cache; a message bus; an application server; Virtual Machine Image (VMI) based services, and/or external endpoint based services.

In some embodiments, the multi-tier application may be obtained by: displaying a representation of the plurality of services in the service library and a representation of applications in the application catalog in a Graphical User Interface (GUI); and displaying, based on the dependency information and in response to a selection of each of the plurality of components, a graphical representation of the multi tier application on the GUI, the graphical representation reflecting the selected components and the dependencies between the selected components.

Next, in step 1020, a cloud agnostic representation of the multi-tier application may be derived, wherein the cloud agnostic representation of the multi-tier application may comprise metadata for: obtaining each of the plurality of components for a plurality of clouds, and starting each of the components, wherein each component in the plurality of components is started based on a starting sequence derived, in part, from the dependency information.

In some embodiments, the method may further comprise: deploying the multi-tier application on at least one of a plurality of clouds using a cloud specific implementation of the multi-tier application, wherein the cloud specific implementation specific to the at least one cloud is obtained based, at least in part, on the cloud agnostic representation of the multi-tier application. In some embodiments, deploying the multi tier application on at least one of the plurality of clouds may comprise obtaining, based on the metadata in the cloud agnostic representation, a cloud specific implementation of each of the component services.

In some embodiments, the methods and modules described herein may be implemented using a variety of wired and/or wirelessly networked processors, various computers, and computing devices, including mobile devices such as smartphones, notebooks, and handheld computers, and various distributed computing systems. In some embodiments, the method and modules described herein may be embodied in computer-readable media, including magnetic and/or optical media and various types of non-volatile memory and/or media.

Other embodiments will be apparent to those skilled in the art from consideration of the specification and practice of one or more embodiments of the disclosed herein. It is intended that the specification and examples be considered as exemplary only, with a true scope and spirit of the invention being indicated by the following claims.

What is claimed is:

1. A method comprising:
    at a device including a processor and a non-transitory memory:
    obtaining, for a multi-tier application comprising a plurality of components, dependency information for each component in the plurality of components, wherein the dependency information for a component in the plurality of components comprises information indicating prerequisites for initiating execution of the component;
    deriving a cloud agnostic representation of the multi-tier application based, in part on the dependency information, wherein the cloud agnostic representation of the multi-tier application comprises metadata for the multi-tier application without cloud-specific information;
    provisioning a plurality of virtual machines to run the plurality of components of the multi-tier application based on the dependency information;
    deriving, from the cloud agnostic representation, cloud-specific commands for deploying the multi-tier application on the plurality of virtual machines; and
    deploying the multi-tier application on the plurality of virtual machines using the cloud-specific commands in order to obtain a cloud specific implementation of the cloud agnostic representation of the multi-tier application.

2. The method of claim 1, wherein the dependency information for each component further comprises residence dependency information and the metadata further comprises:
    Virtual Machine (VM) co-residency information for a first subset of the plurality of components when deployed, the VM co-residency information comprising:
        information indicating a compatibility of at least one first group of components in the first subset for co-residency; or
        information indicating an incompatibility of at least one second group of components in the first subset for co-residency; or
    VM placement information for a second subset of the plurality of components when deployed, the VM placement information comprising a mapping of each component in the second subset to one or more VMs.

3. The method of claim 1, wherein each of the plurality of components are selected from at least one of:
    a service library, the service library comprising a plurality of services, wherein each of the plurality of services is associated with a corresponding service configuration metadata; or
    an application catalog, the application catalog comprising a plurality of predefined multi-tier applications, wherein each of the plurality of predefined multi-tier applications is associated with a corresponding application metadata.

4. The method of claim 3, wherein the multi-tier application is obtained by:
    displaying a representation of the plurality of services in the service library and a representation of applications in the application catalog in a Graphical User Interface (GUI); and
    displaying, based on the dependency information and in response to a selection of each of the plurality of components, a graphical representation of the multi-tier application on the GUI the graphical representation reflecting the selected components and dependencies between the selected components.

5. The method of claim 3, wherein the plurality of services comprise at least one of:
    a web server;
    a relational database;
    a non-relational database;
    a load balancing service;
    a front-end cache;
    a back-end cache;
    a message bus;
    an application server;
    Virtual Machine Image (VMI) based services; or
    external endpoint based services.

6. The method of claim 1, wherein deploying the multi-tier application on the plurality of virtual machines comprises:
    obtaining, based on the metadata in the cloud agnostic representation, the cloud specific implementation of the cloud agnostic representation of the multi-tier application.

7. An apparatus comprising:
    a memory comprising dependency information for a component in a plurality of components of a multi-tier application, wherein the dependency information for the component comprises information indicating prerequisites for initiating execution of the component; and
    a processor coupled to the memory, wherein the processor is configured to:
        obtain, for the multi-tier application, the dependency information for each component in the plurality of components;
        derive a cloud agnostic representation of the multi-tier application based, in part, on the dependency information, wherein the cloud agnostic representation of the multi-tier application comprises metadata for the multi-tier application without cloud-specific information;
        provision a plurality of virtual machines to run the plurality of components of the multi-tier application based on the dependency information;
        derive, from the cloud agnostic representation, cloud-specific commands for deploying the multi-tier application on the plurality of virtual machines; and
        deploy the multi-tier application on the plurality of virtual machines using the cloud-specific commands in order to obtain a cloud specific implementation of the cloud agnostic representation of the multi-tier application.

8. The apparatus of claim 7, wherein the dependency information for each component further comprises residence dependency information and the processor is further configured to:
    obtain the metadata based on the residence dependency information, the metadata comprising:

Virtual Machine (VM) co-residency information for a first subset of the plurality of components when deployed, the VM co-residency information comprising:
  information indicating a compatibility of at least one first group of components in the first subset for co-residency; or
  information indicating an incompatibility of at least one second group of components in the first subset for co-residency; or
VM placement information for a second subset of the plurality of components when deployed, the Vivi placement information comprising a mapping of each component in the second subset to one or more VMs.

9. The apparatus of claim 7, wherein:
the memory comprises:
  a service library, the service library comprising a plurality of services, wherein each of the plurality of services is associated with a corresponding service configuration metadata; or
  an application catalog, the application catalog comprising a plurality of predefined multi-tier applications, wherein each of the plurality of pre-defined multi-tier applications is associated with a corresponding application metadata; and
the processor is configured to:
  select each of the plurality of components from at least one of the service library or the application catalog.

10. The apparatus of claim 9, wherein the apparatus further comprises a display coupled to the processor, wherein to obtain the multi-tier application, the processor is further configured to:
display, on the display, a representation of the plurality of services in the service library and a representation of applications in the application catalog in a Graphical User Interface (GUI); and
display, on the display, based on the dependency information and in response to a selection of each of the plurality of components, a graphical representation of the multi-tier application on the GUI, the graphical representation reflecting the selected components and dependencies between the selected components.

11. The apparatus of claim 9, wherein the plurality of services comprise at least one of:
a web server;
a relational database;
a non-relational database;
a load balancing service;
a front-end cache;
a back-end cache;
a message bus;
an application server;
Virtual Machine Image (VW) based services; or
external endpoint based services.

12. The apparatus of claim 7, wherein to deploy the multi-tier application on the plurality of virtual machines, the processor is configured to:
obtain, based on the metadata in the cloud agnostic representation, the cloud specific implementation of the cloud agnostic representation of the multi-tier application.

13. A non-transitory computer-readable medium comprising instructions, which, when executed by a processor, perform steps in a method, the steps comprising:
obtaining, for a multi-tier application comprising a plurality of components, dependency information for each component in the plurality of components, wherein the dependency information for a component in the plurality of components comprises information indicating prerequisites for initiating execution of the component;
deriving a cloud agnostic representation of the multi-tier application based, in part on the dependency information, wherein the cloud agnostic representation of the multi-tier application comprises metadata for the multi-tier application without cloud-specific information;
provisioning a plurality of virtual machines to run the plurality of components of the multi-tier application based on the dependency information;
deriving, from the cloud agnostic representation, cloud-specific commands for deploying the multi-tier application on the plurality of virtual machines; and
deploying the multi-tier application on the plurality of virtual machines using the cloud-specific commands in order to obtain a cloud specific implementation of the cloud agnostic representation of the multi-tier application.

14. The computer-readable medium of claim 13, wherein the dependency information for each component further comprises residence dependency information and the metadata further comprises:
Virtual Machine (VM) co-residency information for a first subset of the plurality of components when deployed, the VM co-residency information comprising:
  information indicating a compatibility of at least one first group of components in the first subset for co-residency; or
  information indicating an incompatibility of at least one second group of components in the first subset for co-residency; or
VM placement information for a second subset of the plurality of components when deployed, the VM: placement information comprising a mapping of each component in the second subset to one or more VMs.

15. The computer-readable medium of claim 13, wherein each of the plurality of components are selected from at least one of:
a service library, the service library comprising a plurality of services, wherein each of the plurality of services is associated with a corresponding service configuration metadata; or
an application catalog, the application catalog comprising a plurality of predefined multi-tier applications, wherein each of the plurality of predefined multi-tier applications is associated with a corresponding application metadata.

16. The computer-readable medium of claim 15, wherein the multi-tier application is obtained by:
displaying a representation of the plurality of services in the service library and a representation of applications in the application catalog in a Graphical User Interface (GUI); and
displaying, based on the dependency information and in response to a selection of each of the plurality of components, a graphical representation of the multi-tier application on the GUI, the graphical representation reflecting the selected components and dependencies between the selected components.

17. The method computer-readable medium of claim 15, wherein the plurality of services comprise at least one of:
a web server;

a relational database;
a non-relational database;
a load balancing service;
a front-end cache;
a back-end cache;
a message bus;
an application server;
Virtual Machine Image (VW) based services; or
external endpoint based services.

18. The computer-readable medium of claim 13, wherein deploying the multi-tier application on the at least one of the plurality of clouds comprises:
   obtaining, based on the metadata in the cloud agnostic representation, the cloud specific implementation of the cloud agnostic representation of the multi-tier application.

19. The method of claim 3 further comprising:
   selecting a previously stored application from the application catalog;
   modifying the previously stored application to obtain a modified application, including adding or removing one or more services from the service library and adding or removing one or more previously stored applications from the application catalog;
   obtaining the dependency information for the modified application; and
   saving the modified application in the application catalog as the multi-tier application.

20. The apparatus of claim 9, wherein the processor is further configured to:
   select a previously stored application from the application catalog;
   modify the previously stored application to obtain a modified application, including adding or removing one or more services from the service library and adding or removing one or more previously stored applications from the application catalog;
   obtain the dependency information for the modified application; and
   save the modified application in the application catalog as the multi-tier application.

21. The computer-readable medium of claim 15 further comprising:
   selecting a previously stored application from the application catalog;
   modifying the previously stored application to obtain a modified application, including adding or removing one or more services from the service library and adding or removing one or more previously stored applications from the application catalog;
   obtaining the dependency information for the modified application; and
   saving the modified application in the application catalog as the multi-tier application.

* * * * *